US010997797B2

(12) United States Patent
Vossoughi et al.

(10) Patent No.: US 10,997,797 B2
(45) Date of Patent: May 4, 2021

(54) VEHICLE PARKING AND MASS TRANSPORT BEACON SYSTEM

(71) Applicant: CITIFYD, INC., Portland, OR (US)

(72) Inventors: Sohrab Vossoughi, Portland, OR (US); Samuel Spencer Jeibmann, Portland, OR (US); Andrew Stam Parnell, Portland, OR (US); Dave Cole, Portland, OR (US); Alma Emadi, Portland, OR (US); Christopher J. Vondrachek, Tigard, OR (US); Ken Dieringer, Portland, OR (US); Massoud Mollaghaffari, Tigard, OR (US)

(73) Assignee: CITIFYD, INC., Portland, OR (US)

( * ) Notice: Subject to any disclaimer, the term of this patent is extended or adjusted under 35 U.S.C. 154(b) by 200 days.

(21) Appl. No.: 15/780,795

(22) PCT Filed: Dec. 2, 2016

(86) PCT No.: PCT/US2016/064829
§ 371 (c)(1),
(2) Date: Jun. 1, 2018

(87) PCT Pub. No.: WO2017/096307
PCT Pub. Date: Jun. 8, 2017

(65) Prior Publication Data
US 2020/0250896 A1 Aug. 6, 2020

Related U.S. Application Data

(60) Provisional application No. 62/316,359, filed on Mar. 31, 2016, provisional application No. 62/262,282, filed on Dec. 2, 2015.

(51) Int. Cl.
G07B 15/04 (2006.01)
G07C 9/22 (2020.01)
(Continued)

(52) U.S. Cl.
CPC ......... *G07B 15/04* (2013.01); *G07C 9/00817* (2013.01); *G07C 9/22* (2020.01);
(Continued)

(58) Field of Classification Search
CPC ......... G06Q 10/08; G07B 15/00; G07B 15/02
(Continued)

(56) References Cited

U.S. PATENT DOCUMENTS 8,290,876 B1 10/2012 Powell
9,204,257 B1 12/2015 Mendelson
(Continued)

FOREIGN PATENT DOCUMENTS

WO 2015172161 A1 11/2015
WO WO-2017096307 A1 * 6/2017 ............ H04W 4/029

Primary Examiner — Edwyn Labaze
(74) Attorney, Agent, or Firm — Stoel Rives LLP

(57) ABSTRACT

A vehicle parking and mass transport beacon system (60) implemented with a beacon device (10) configured as a wireless identifier and authentication mechanism offers a user a capability of bypassing infrastructures of commercial parking lots and facilities, mass transit systems, and taxi services when using them. The beacon system includes a source beacon and a user beacon, the latter of which implemented in a user smart device (36) such as a smartphone. The use of a source beacon and user smart device enables elimination of reliance on a cellular communication connection from the time of the user's grant of permission for action to the time of separation of the user smart device and the beacon by a distance outside the range of connectivity between them. Such elimination of reliance on cellular communication connection avoids delay and communication coverage issues stemming from use of a cellular communication network.

19 Claims, 38 Drawing Sheets

(51) Int. Cl.
  *G07C 9/28* (2020.01)
  *G07C 9/00* (2020.01)
  *H04W 4/029* (2018.01)
  *H04W 4/02* (2018.01)
  *H04W 4/42* (2018.01)
  *H04W 4/80* (2018.01)

(52) U.S. Cl.
  CPC .............. *G07C 9/28* (2020.01); *H04W 4/023* (2013.01); *H04W 4/027* (2013.01); *H04W 4/029* (2018.02); *H04W 4/42* (2018.02); *H04W 4/80* (2018.02); *G07C 2009/00841* (2013.01)

(58) Field of Classification Search
  USPC ........................................ 235/384, 375, 487
  See application file for complete search history.

(56) References Cited

U.S. PATENT DOCUMENTS

| | | | |
|---|---|---|---|
| 2003/0224766 A1* | 12/2003 | Stockhammer | G07B 15/04 455/414.1 |
| 2014/0036076 A1* | 2/2014 | Nerayoff | G06K 9/00791 348/148 |
| 2014/0213176 A1* | 7/2014 | Mendelson | G01S 5/04 455/39 |
| 2014/0335897 A1* | 11/2014 | Clem | G08G 1/147 455/456.3 |
| 2015/0025947 A1 | 1/2015 | Dutta et al. | |
| 2015/0235477 A1 | 8/2015 | Simkin et al. | |
| 2015/0356498 A1* | 12/2015 | Casanova | G07B 15/02 705/13 |
| 2017/0046681 A1* | 2/2017 | Dixon | G06Q 50/30 |
| 2017/0063211 A1* | 3/2017 | Mochida | H02K 15/03 |
| 2018/0259976 A1* | 9/2018 | Williams | G01C 21/32 |
| 2019/0206009 A1* | 7/2019 | Gibson | G06Q 50/30 |
| 2020/0018602 A1* | 1/2020 | Beaurepaire | G08G 1/096866 |

\* cited by examiner

Software/hardware Stack

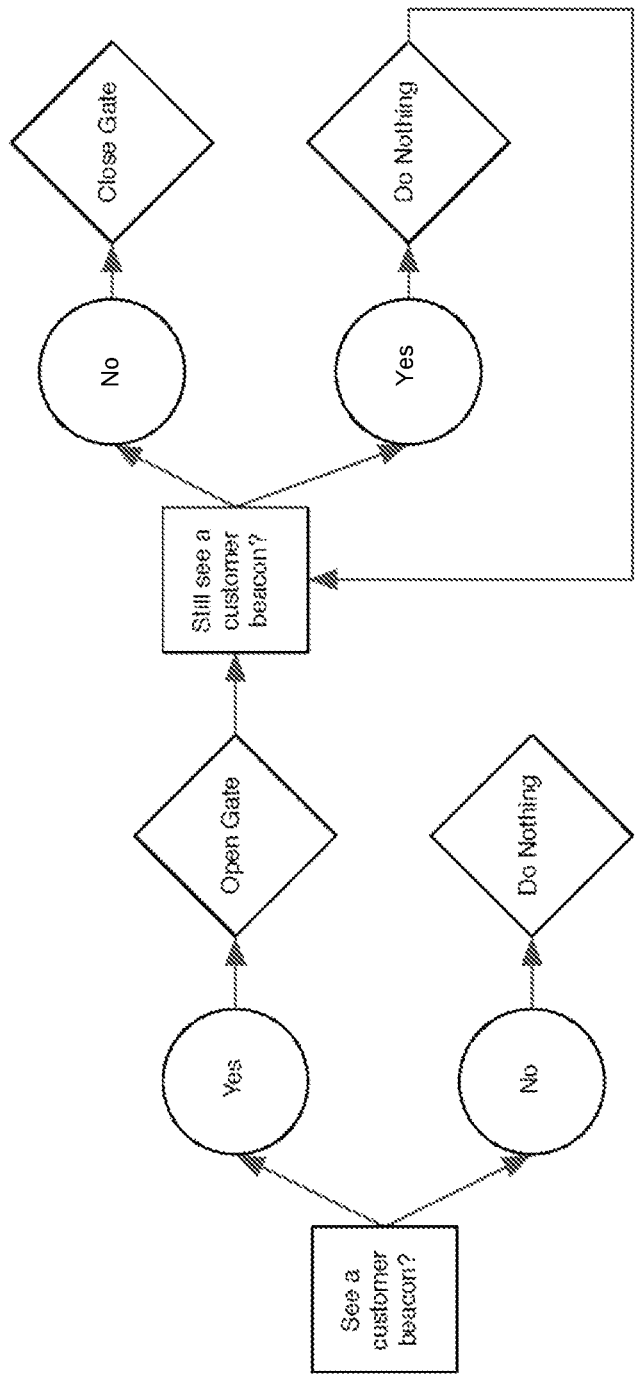

Ingress – Vehicles Entering Parking Area

1. Directional antenna limits reception of Bluetooth signal to vehicle nearest the Beacon.
2. Antenna ideally positioned to provide line-of-sight into vehicle.

Egress – Vehicles Exiting Parking Area

1. Second beacon, at rear of parking kiosk or gate, provides exit monitoring.

Combined Ingress/Egress Beacon

1. Two separate Bluetooth radios installed in one beacon:
   #1, with a directional antenna for ingress
   #2, with omni-directional antenna for egress

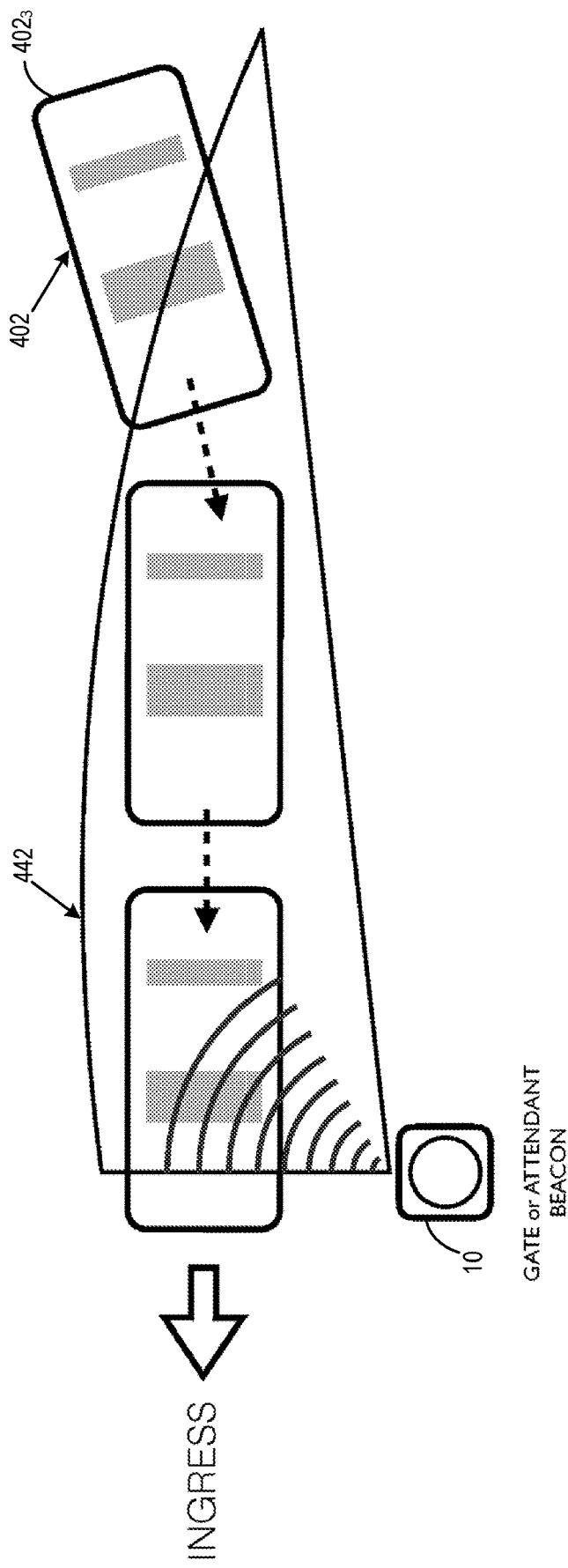

VEHICLE PARKING AND MASS TRANSPORT BEACON SYSTEM

COPYRIGHT NOTICE

©2016 Citifyd, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

This application relates to beacon technology and, in particular, to a vehicle parking and mass transport beacon system implemented with a beacon device configured as a wireless identifier and authentication mechanism that offers a user a capability of bypassing infrastructures of commercial parking lots and facilities, mass transit systems, and taxi services when using them.

SUMMARY OF THE DISCLOSURE

A preferred parking and mass transport beacon system configured for use in vehicle parking or mass transit system travel includes a source beacon and a customer or user beacon, the latter of which implemented in a customer or user smart device such as a smartphone. In a preferred embodiment, the source beacon uses Bluetooth Low-Energy Generic Attribute (BTLE GATT) Profile advertisement data to announce its presence to a customer or user. A user smart device with Bluetooth Low-Energy (BLE) wireless capability then discovers the source beacon within a range of 70 m by monitoring for a specific Universally Unique Identifier (UUID) in the Bluetooth Low-Energy advertisement data. Once a user smart device identifies a source beacon and is within a predetermined range (e.g., distance of 1.5 m), the user beacon starts an authentication process, which includes establishing a wireless communication link between the source beacon and the user smart device. The source beacon reads the user beacon advertisement, validates it, and signals approval. An IBeacon implementation of BLE wireless technology can also be used.

A mobile application or App operating on the user smart device causes it to initiate the start and the end of a vehicle parking or mass transit travel transaction session to help reduce false positives. False positives could be caused by users entering and exiting a parking facility without their vehicles or persons walking past a mass transit station terminus without boarding a mass transit vehicle. This is accomplished through explicit action taken on a push notification or within the App itself.

The vehicle parking and mass transport beacon system enables a user to bypass infrastructures of commercial parking lots or facilities, mass transit systems, and taxi services when using them. The use of a source beacon and user smart device enables elimination of reliance on a cellular or Wi-Fi communication network connection from the time of the user's grant of permission for action to the time of separation of the user smart device and the beacon by a distance outside the range of connectivity between them. Such elimination of reliance on cellular or Wi-Fi communication connection avoids delay and communication coverage issues stemming from use of a cellular or Wi-Fi communication network.

Additional aspects and advantages will be apparent from the following detailed description of preferred embodiments, which proceeds with reference to the accompanying drawings.

BRIEF DESCRIPTION OF THE DRAWINGS

FIGS. 3A-1 and 3A-2, 3B-1 and 3B-2, and 3C are flow diagrams outlining the process steps performed cooperatively by the source beacon and a user smart device in initiating the start and the end of a vehicle parking or mass transit travel transaction session.

FIGS. 9-1 and 9-2 form an annotated flow diagram outlining and describing the process steps performed in the operation of the disclosed parking and mass transport beacon system in the case of a transit system passenger or rider entering into and exiting from a mass transit vehicle.

FIGS. 10-1 and 10-2 form an annotated flow diagram outlining and describing the process steps performed in the operation of the disclosed parking and mass transport beacon system in the case of a vehicle driver entering into and exiting from a gated parking facility having a beacon attached to a barrier gate.

FIGS. 19A, 19B, 19C, 19D, and 19E are pictorial diagrams presenting different processing stages in the implementation of a method of achieving accurate authorization of a vehicle approaching a parking garage or surface lot entrance or exit location.

FIGS. 20-1, 20-2, 20-3, and 20-4 are annotated screenshots of a parking attendant's hand-held device that show the functions performed by a monitoring App operating on a parking attendant's hand-held device in cooperation with a backend server in carrying out parking facility management activities.

DETAILED DESCRIPTION OF PREFERRED EMBODIMENTS

Figure 1A:
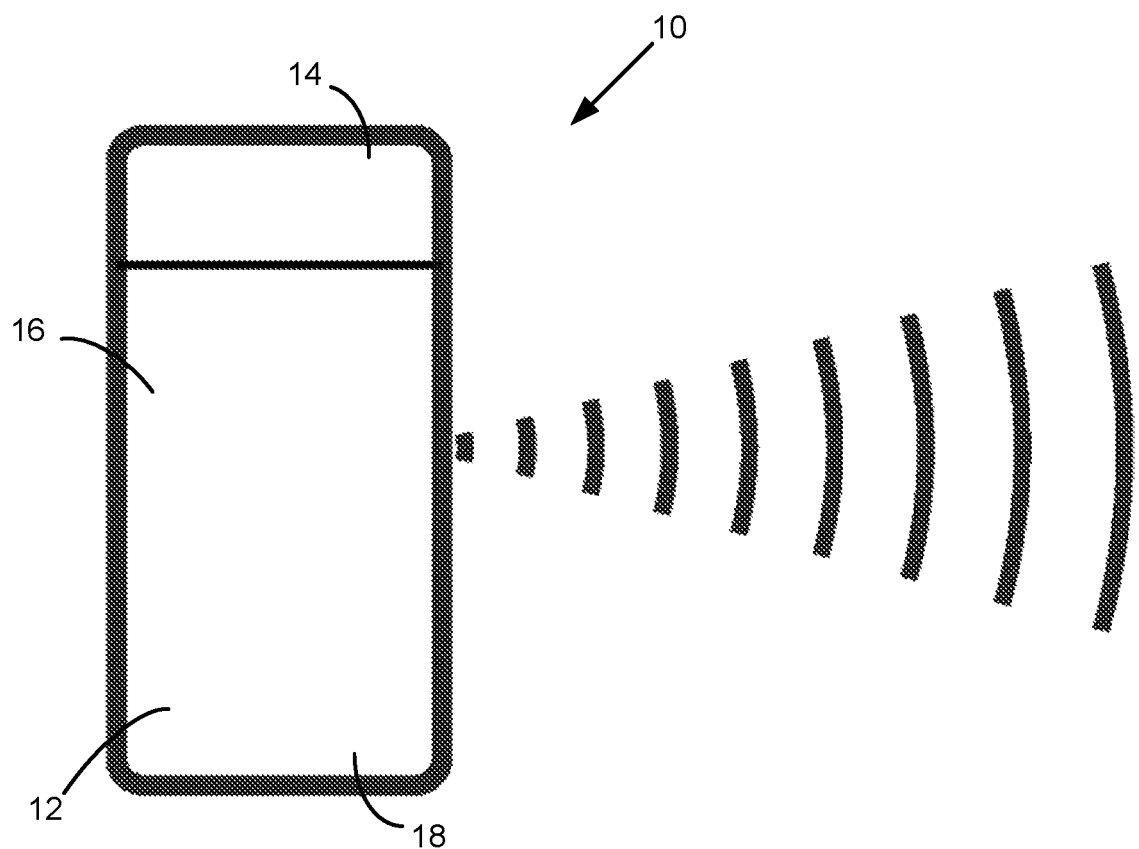
FIGS. 1A, 1B, and 1C are, respectively, a simplified pictorial diagram, a component block diagram, and a software/hardware stack diagram of a source beacon of the present disclosure.
Figure 1C:
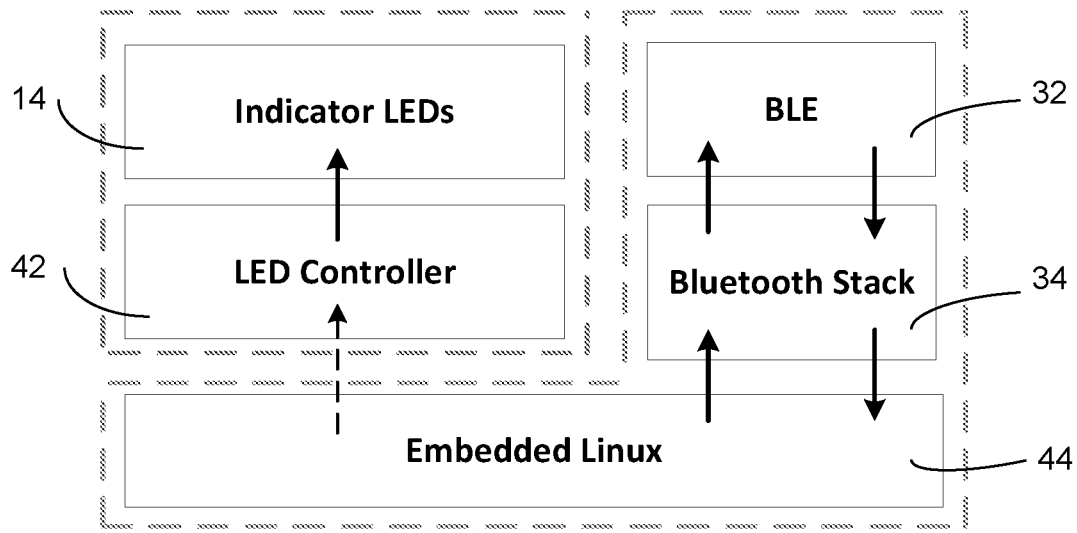
Figure 1B:
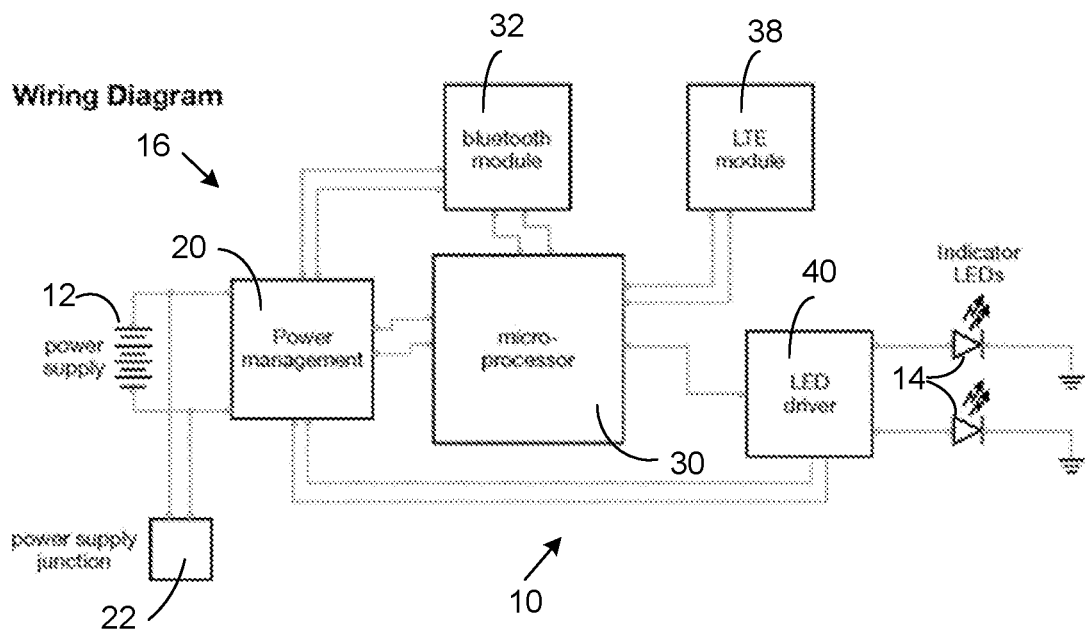

FIGS. 1A, 1B, and 1C are, respectively, a simplified pictorial diagram, a component block diagram, and a software/hardware stack diagram of a source beacon 10 of the present disclosure.

With reference to FIG. 1A, beacon 10 is a small self-contained device with a power supply 12, light-emitting diode (LED) indicator lights 14, and electronic components 16 housed in a durable watertight housing 18.

Figure 4:
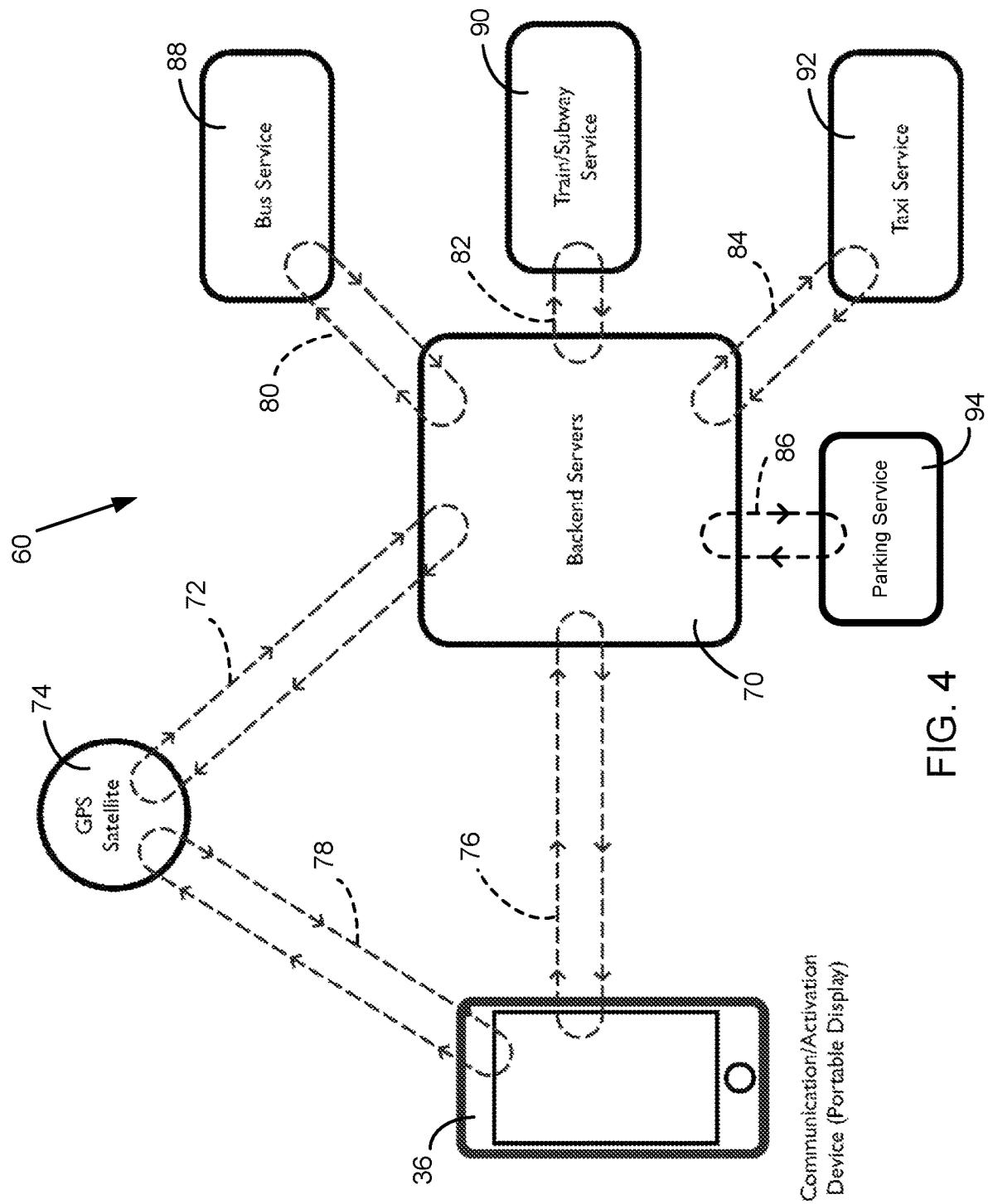
FIG. 4 is a system block diagram showing, with the source beacon of FIGS. 1A, 1B, and 1C removed, the configuration and communication links between different components included in the group of main components of a parking and mass transport beacon system of the present disclosure.
Figure 5:
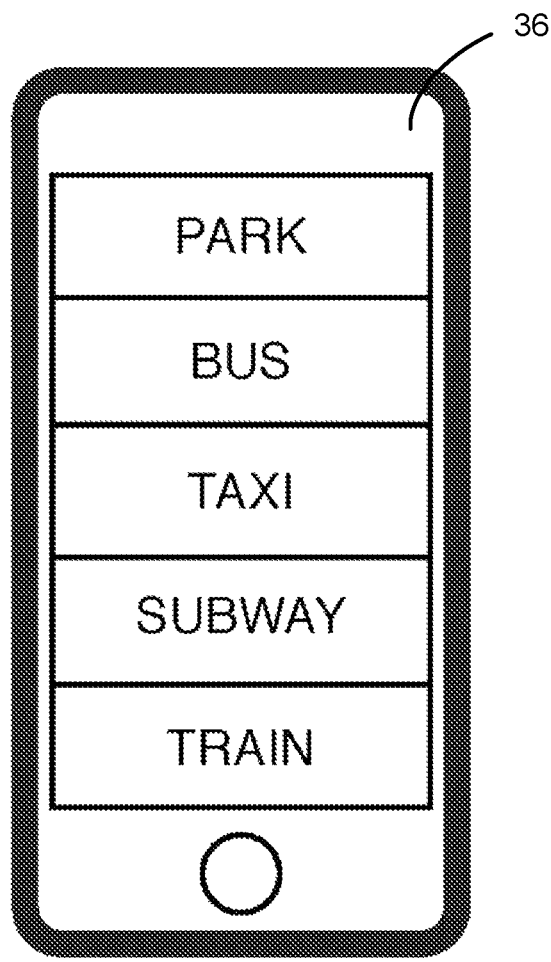
FIG. 5 is a diagram of an on-screen smartphone menu display of parking or mode of transportation activities from which a customer can select during operation of the disclosed parking and mass transport beacon system.
Figures 1, 10:
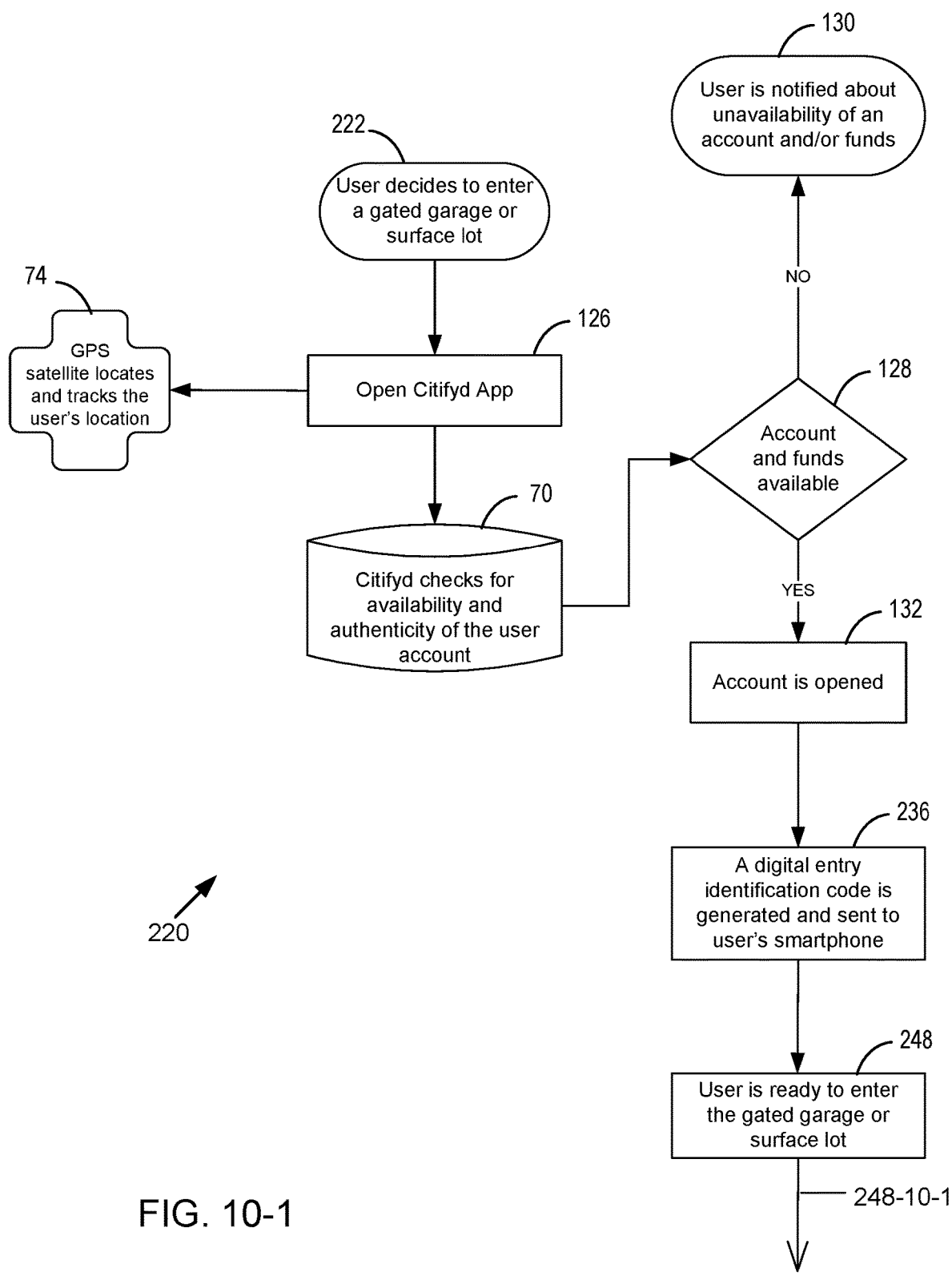
Figures 2, 10:
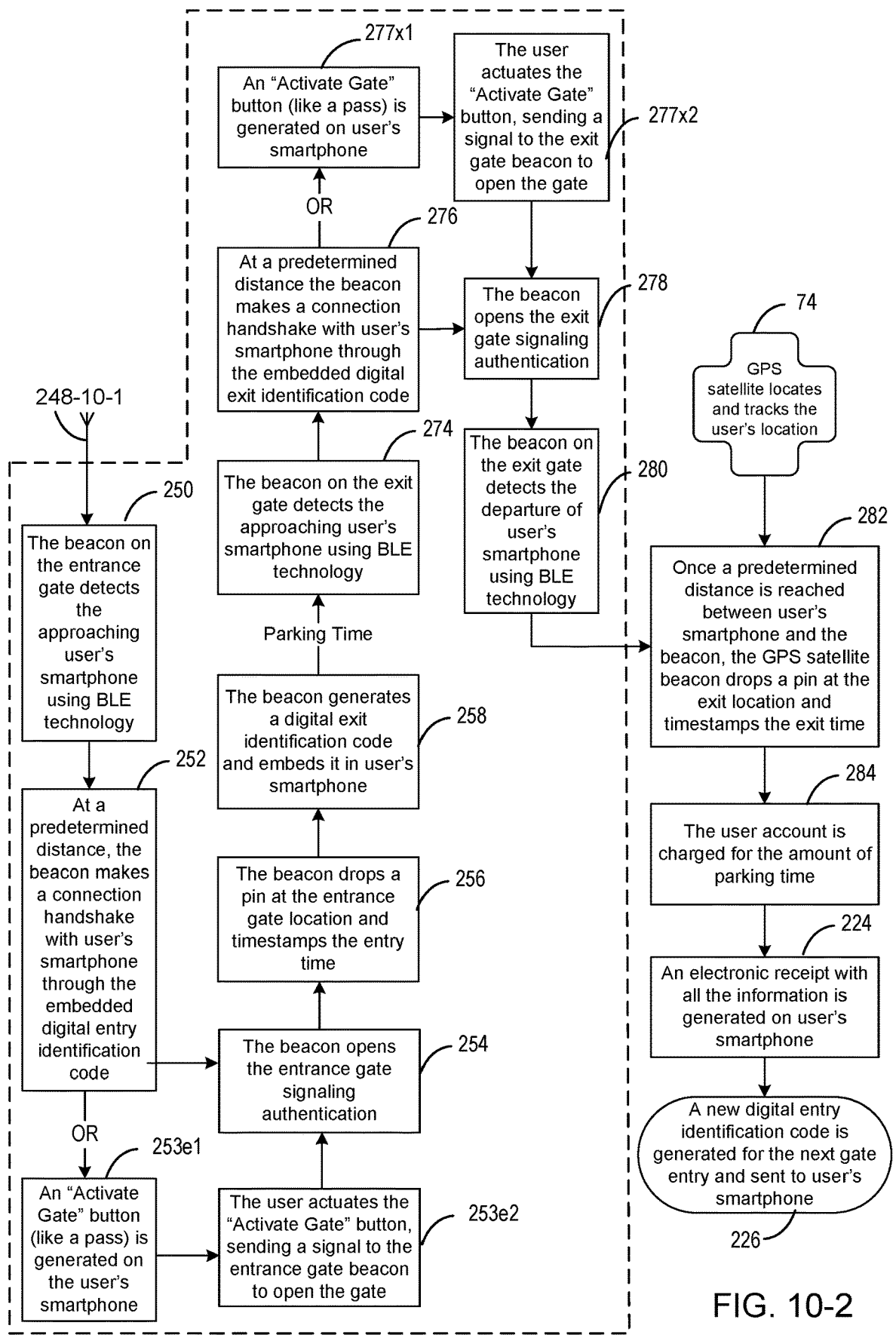

With reference to FIGS. 1B and 10, beacon 10 includes a lithium polymer (LiPo) rechargeable battery functioning as power supply 12 that is connected to a power management module 20. Power management module 20 delivers appropriate voltages for application to the several electronic components 16 contained in housing 18. A power supply junction 22 provides external power supply access to beacon 10. A microprocessor 30 controls the operation of a wireless connection interface module 32, which is wireless communication circuitry using a wireless communication protocol to produce a short-range wireless radio signal (e.g., Bluetooth®, Zigbee®, or Near Field Communication (NFC) wireless communication technologies). In the embodiments described, a multiprotocol system on a chip (SoC) such as an nRF51822 Bluetooth® Smart (also called Bluetooth® low energy or BLE) and 2.4 GHz SoC having an embedded 2.4 GHz transceiver constitutes a Bluetooth® signal interface module 32 that receives program instructions from a Bluetooth® protocol stack 34 for short range communication with a customer smart device 34 such as a smartphone (FIG. 4). Microprocessor 30 also controls the operation of a long-term evolution (LTE) module 38 implementing a standard for wireless communication of high-speed data transfer for mobile devices and data terminals. An LED driver 40 applies, in response to an LED controller 42, voltages to red, green, blue (RGB) LED indicator lights 14 providing visual status information about the operation of beacon 10. An embedded Linux operating system software module 44 provides program instructions to microprocessor 30 to control the operation of beacon 10, including LED controller 42 and Bluetooth® protocol stack 34.

Figure 2A:
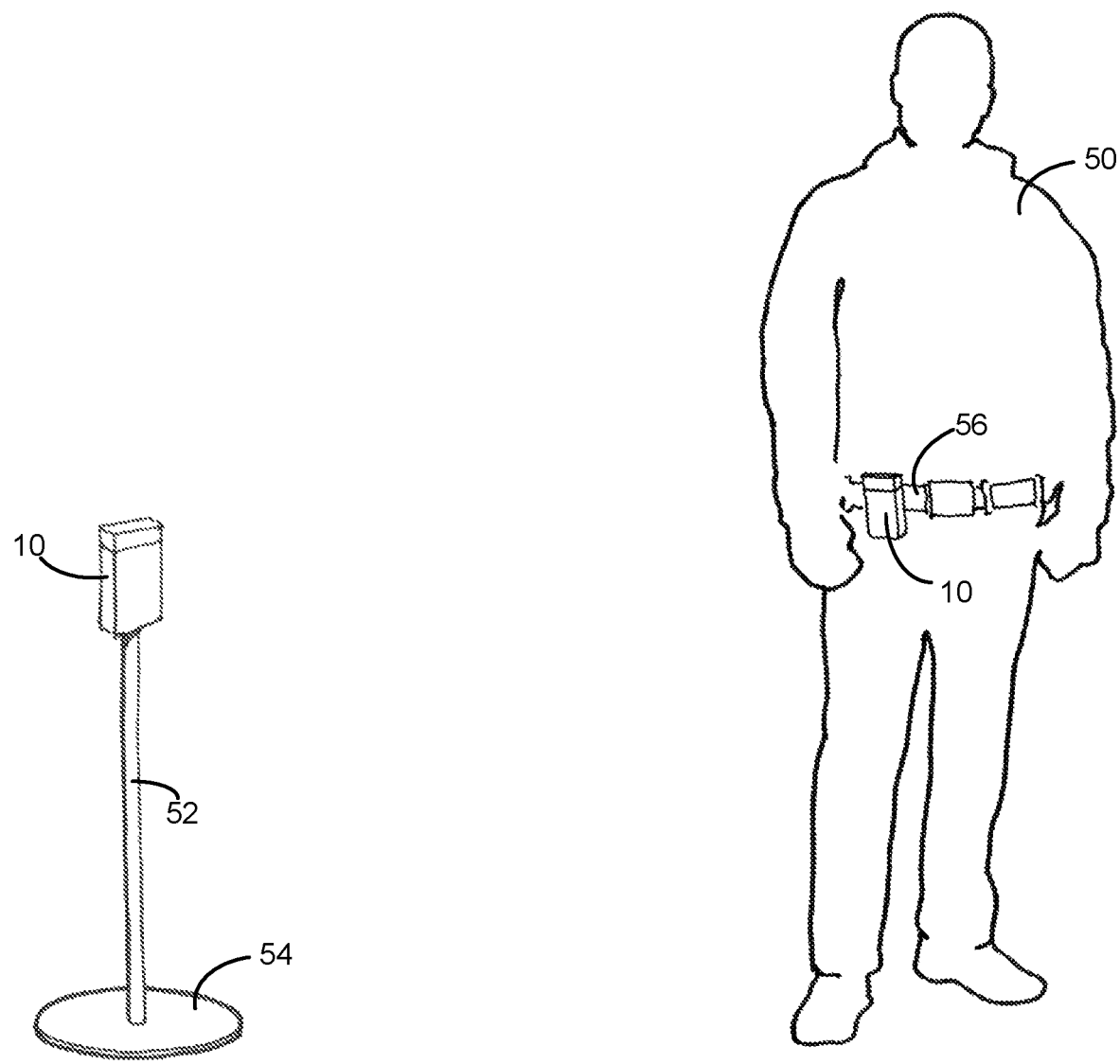
FIG. 2A is a diagram showing a source beacon mounted on top of a pole supported on a floor base or mounted on a waist belt worn by an operator/agent.
Figure 2B:
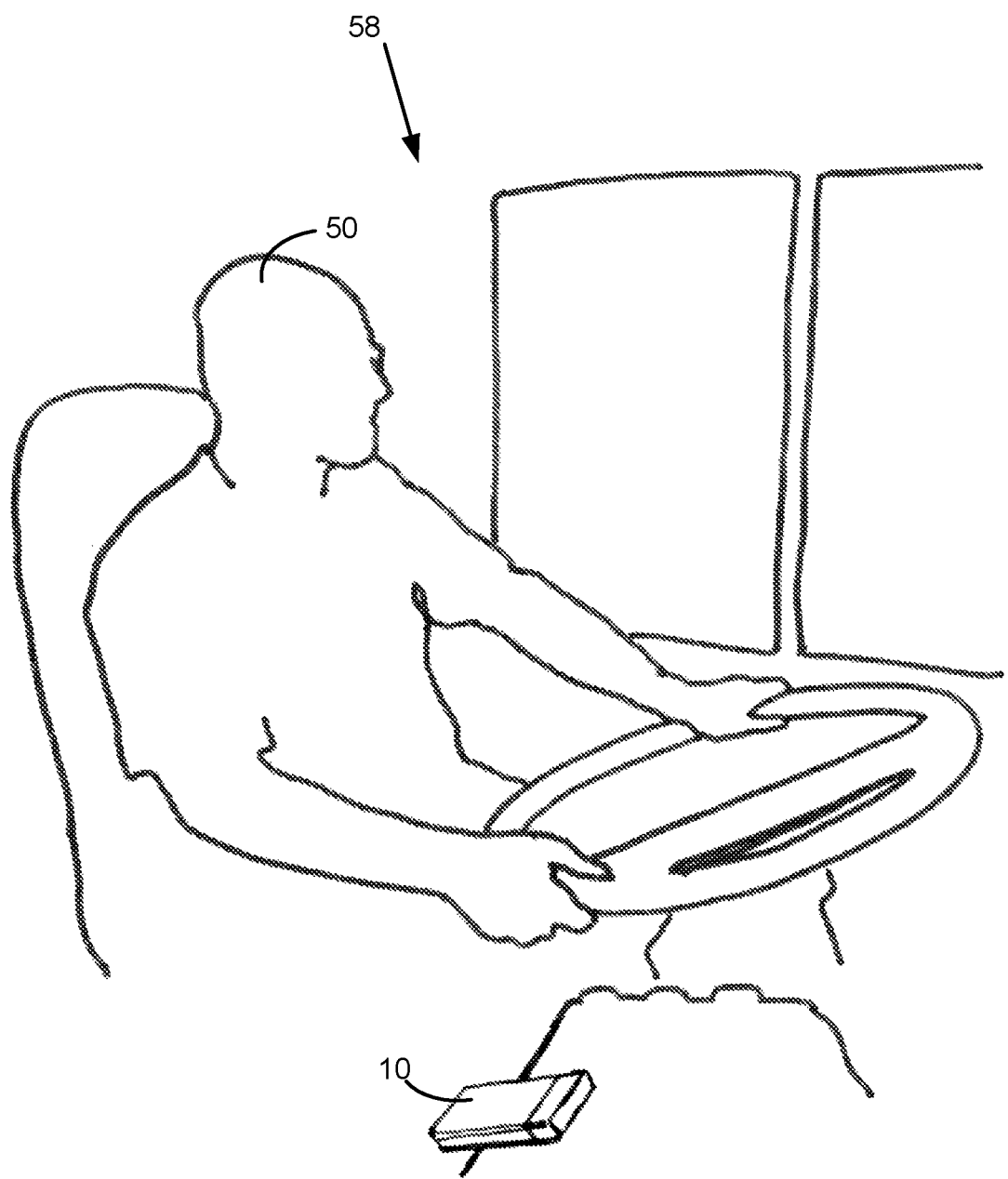
FIG. 2B is a diagram showing a source beacon placed in a mass transit vehicle cab.

FIGS. 2A and 2B show that beacon 10 can be worn by an operator/agent 50 or attached to many surfaces of and locations in a vehicle parking or mass transit service facility. FIG. 2A shows beacon 10 that is mounted on top of a pole 52 supported on a floor base 54 or that is attached to a waist belt 56 worn by a vehicle driver, venue operator, system agent, or system attendant (hereafter, driver/attendant) 50, allowing mobility and outdoor usage. Beacon 10 can be mounted also on a wall or other fixed structure. FIG. 2B shows beacon 10 placed in a transit vehicle 58, such as a bus, taxi, ferry, or train, at a location close to an entry or exit door of the vehicle.

Figures 1, 3A:
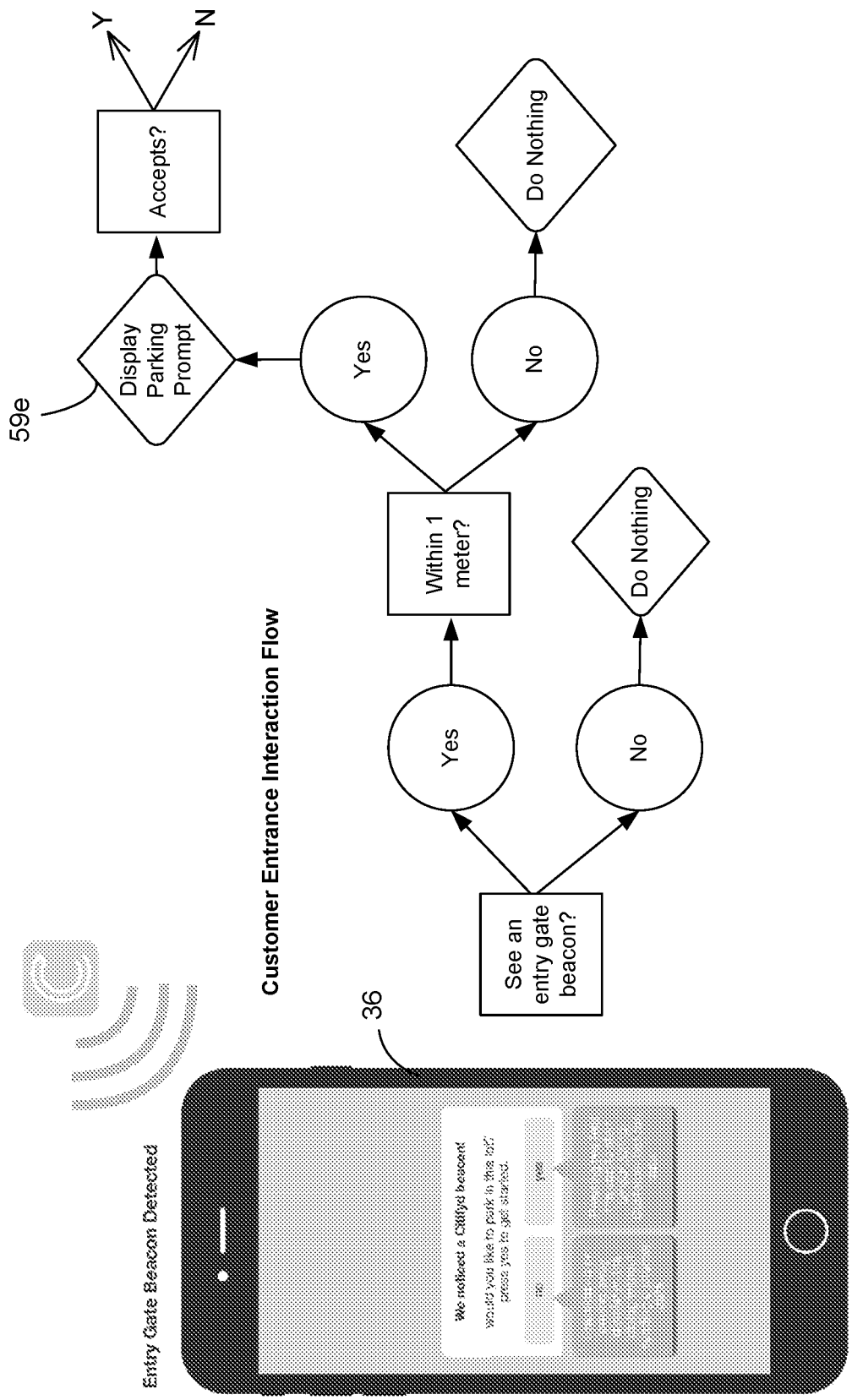
Figures 2, 3A:
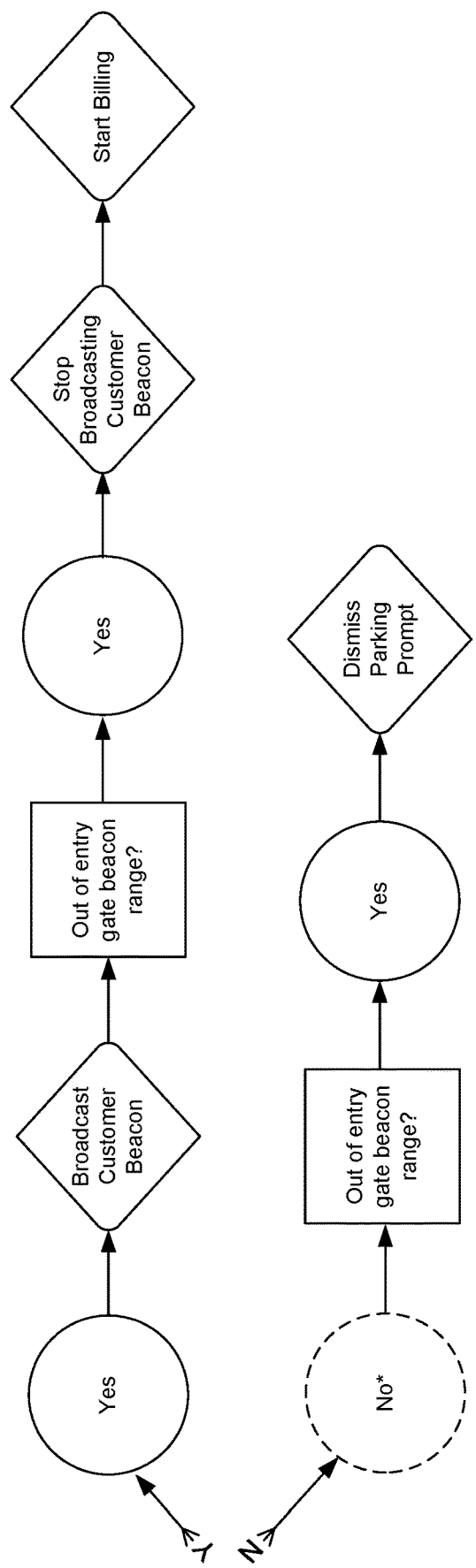
Figures 1, 3B:
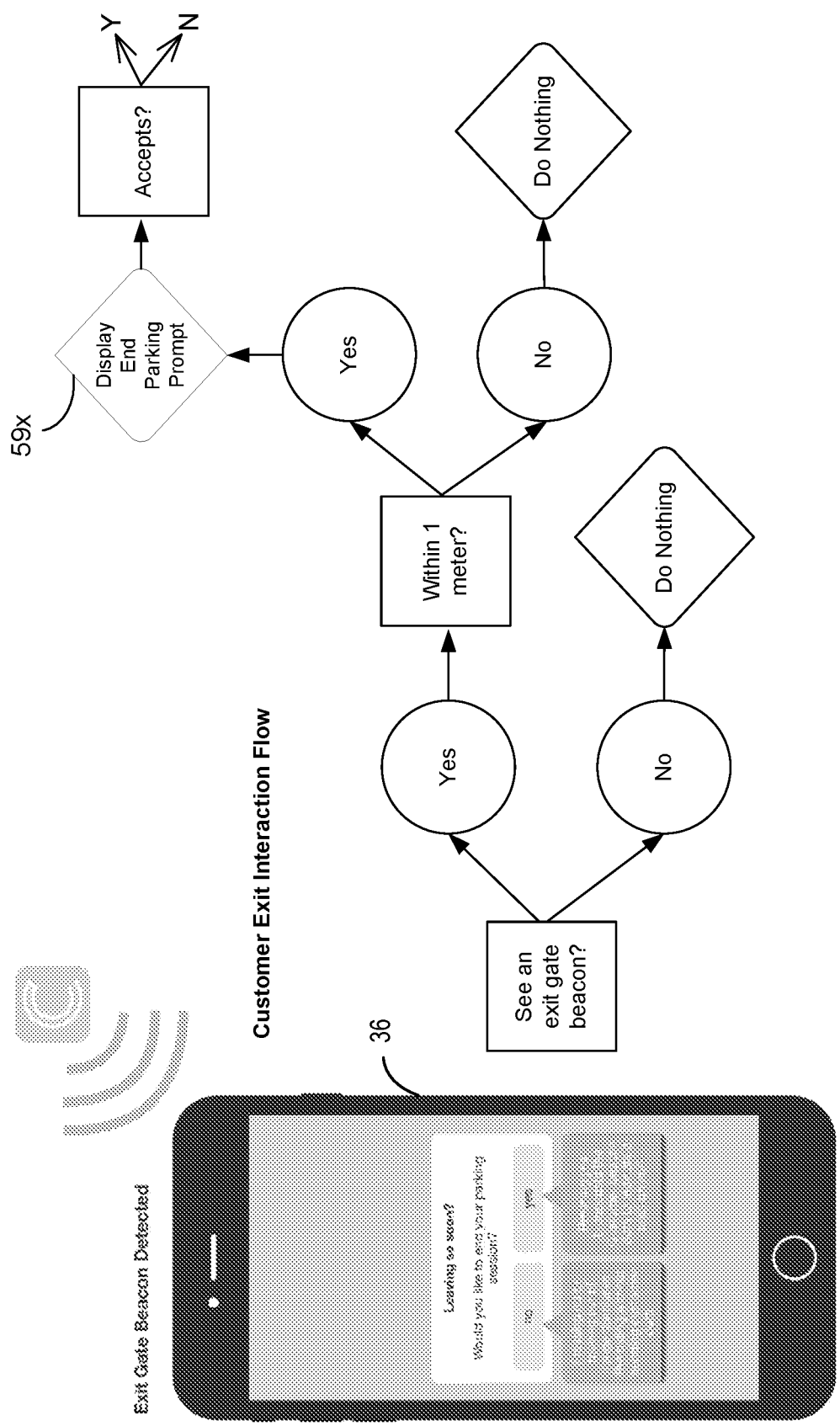
Figures 2, 3B:
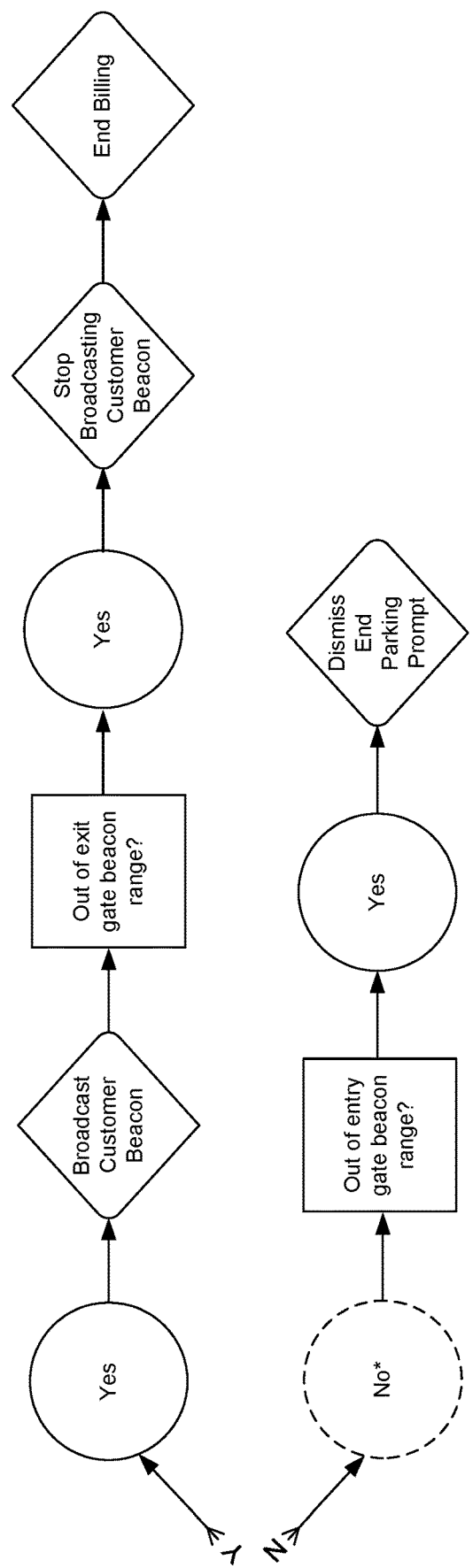

FIGS. 3A-1 and 3A-2 (hereafter, FIG. 3A), FIGS. 3B-1 and 3B-2 (hereafter, FIG. 3B), and FIG. 3C are flow diagrams outlining the process steps performed cooperatively by beacon 10 and smartphone 36 in initiating the start and the end of a vehicle parking or mass transit travel transaction session. FIGS. 3A and 3B show, in response to detection of beacon 10 by smartphone 36, the interaction between them during the processes of, respectively, customer entrance (i.e., ingress) into and customer exit (i.e., egress) from a parking surface lot or garage facility or a mass transit station. FIG. 3A also shows a display parking prompt produced by an App operating on smartphone 36 to appear on the display screen of smartphone 36 as the customer approaches the customer entrance, as indicated by a decision block 59e of the flow diagram. "Citifyd App" is the name given to the App operating on user smartphone 36. FIG. 3B also shows a display end parking prompt produced by the Citifyd App to appear on the display screen of smartphone 36 as the customer approaches the customer exit, as indicated by a decision block 59x of the flow diagram. FIG. 3C shows, in response to detection of the customer beacon in smartphone 36 by beacon 10, the operation of beacon 10 in the control of opening and closing a barrier gate of the parking facility or mass transit station terminus.

In all device-to-device interactions taking place in the preferred embodiments described, smartphone 36 acts as the primary or Master device informing all secondary or Slave devices of the customer's intentions. When smartphone 36 is within range (e.g., 1 m) of beacon 10, the Citifyd App operating on smartphone 36 informs the customer of actions the customer can take. If the customer has no active vehicle parking or mass transit travel session, the Citifyd App prompts with messaging asking whether the customer would like to start a session. If the customer is currently in an active session, the Citifyd App prompts the customer to end the session.

Beacon 10, when broadcasting, can be identified from 45 ft (13.7 m) to 230 ft (70 m) away with fair accuracy. The closer smartphone 36 is to beacon 10, the greater the accuracy. Once smartphone 36 detects beacon 10, functional data are automatically sent to and from beacon 10 without the customer's permission. The Citifyd App tracks and calculates its distance from beacon 10 and prompts smartphone 36 when a range of 1.0 m or less has been reached. The Citifyd App begins broadcasting its own advertisement data until the distance between beacon 10 and smartphone 36 exceeds 1.0 m. For a case in which beacon 10 is the sole device with Internet connectivity, beacon 10 can be configured to send from a backend server over a wireless communication link through cellular communication network protocols (FIG. 4) to smartphone 36 a push notification asking further permission for action. If the customer responds by granting permission, the Citifyd App begins broadcasting its own advertisement data until the distance between beacon 10 and smartphone 36 exceeds 1.0 m.

FIGS. 4, 5, 6, 7, and 8 are system block diagrams presented to facilitate an understanding of the following description of the operation of a vehicle parking and mass transport beacon system 60 implemented with beacon 10.

FIGS. 4 and 6-8 show the main components and communication links between different ones of the main components in vehicle parking and mass transport beacon system 60. FIG. 4 omits beacon 10 from system 60 to show the system infrastructure and communication links established before beacon 10 is placed in operation.

With reference to FIG. 4, system 60 includes one or more backend servers 70 (hereafter, backend servers 70) on which a parking or transportation service provider stores vehicle parking and transit rider customer account information and transaction information. A preferred parking service provider is a municipality, a private parking provider, or other business organization that uses backend servers 70 to process transactions associated with established vehicle driver parking fee payment accounts. (A parking service provider could, of course, enter into a contractual arrangement with a separate entity to process transactions associated with the parking fee payment accounts.) A preferred transportation service provider is a regional mass transit agency offering one or more of bus and any one of various rail transportation services, or a private organization offering transportation services. Backend servers 70 are implemented with a communication signal interface to establish a wireless radio signal communication link 72 with a navigation system 74, such as the global positioning system (GPS) space-based satellite network, and a wireless communication link 76 through cellular communication network protocols with a smart, wireless-connection enabled mobile communication device, such as smartphone 36 carried by the customer. Smartphone 36 is implemented with a communication signal interface to establish communication link 76 and establish a wireless radio signal communication link 78 with GPS navigation system 74. Communication links 72 and 78 established with GPS navigation system 74 are used to determine, and provide backend servers 70 with, information about the location and movement of the customer carrying smartphone 36. GPS navigation system 74 knows the customer's exact location (e.g., gate, bus stop, street corner, and the like) by tracking customer smartphone 36.

FIG. 4 shows backend servers 70 established with communication links 80, 82, 84, and 86 through wireless globally accessible information (e.g., Internet Protocol) networks with transit rider customer accounts of a bus service provider 88, a train/subway service provider 90, and a taxi service provider 92 and parking customer accounts of a parking service provider 94, respectively. Communication links 80, 82, and 84 enable bus service provider 88, train/subway service provider 90, and taxi service provider 92 to access travel activity and payment information relating to their respective transit rider customer accounts. Communication link 86 enables parking service provider 94 to access parking activity and payment information relating to its parking customer accounts.

Figure 6:
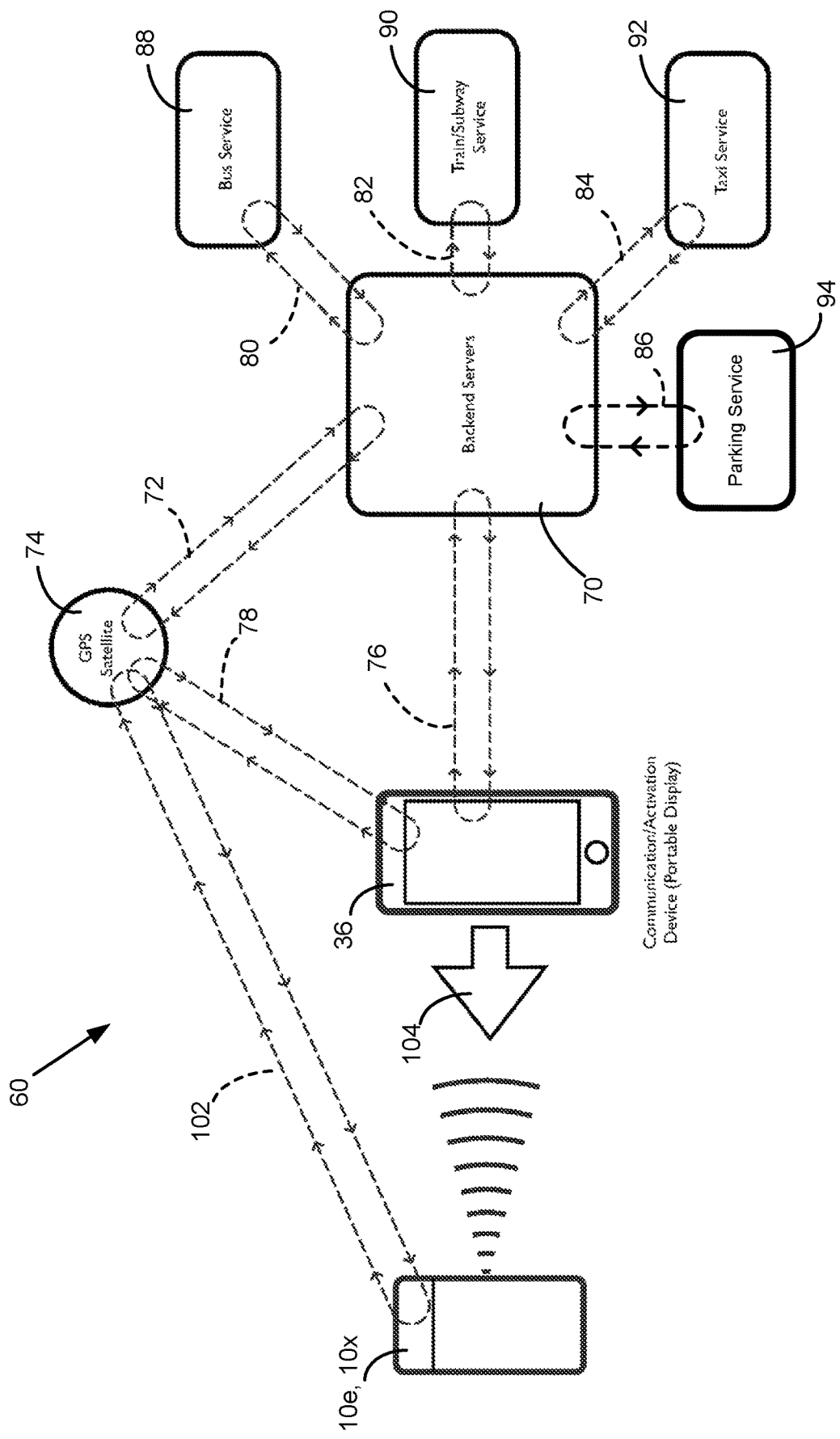
FIGS. 6, 7, and 8 show among the components of the disclosed parking and mass transport beacon system the various communication links that are active during various stages of system operation.
Figure 7:
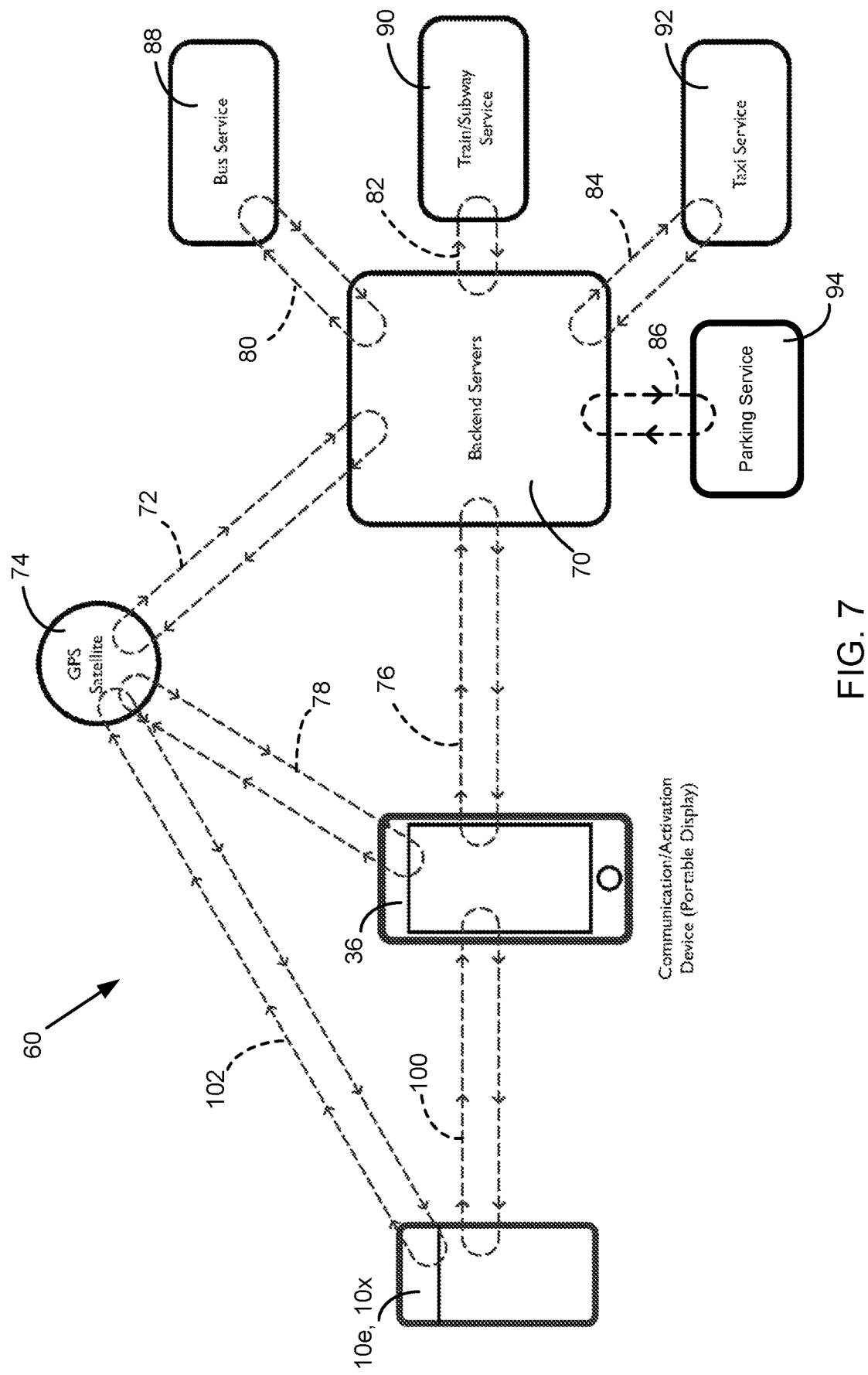
Figure 8:
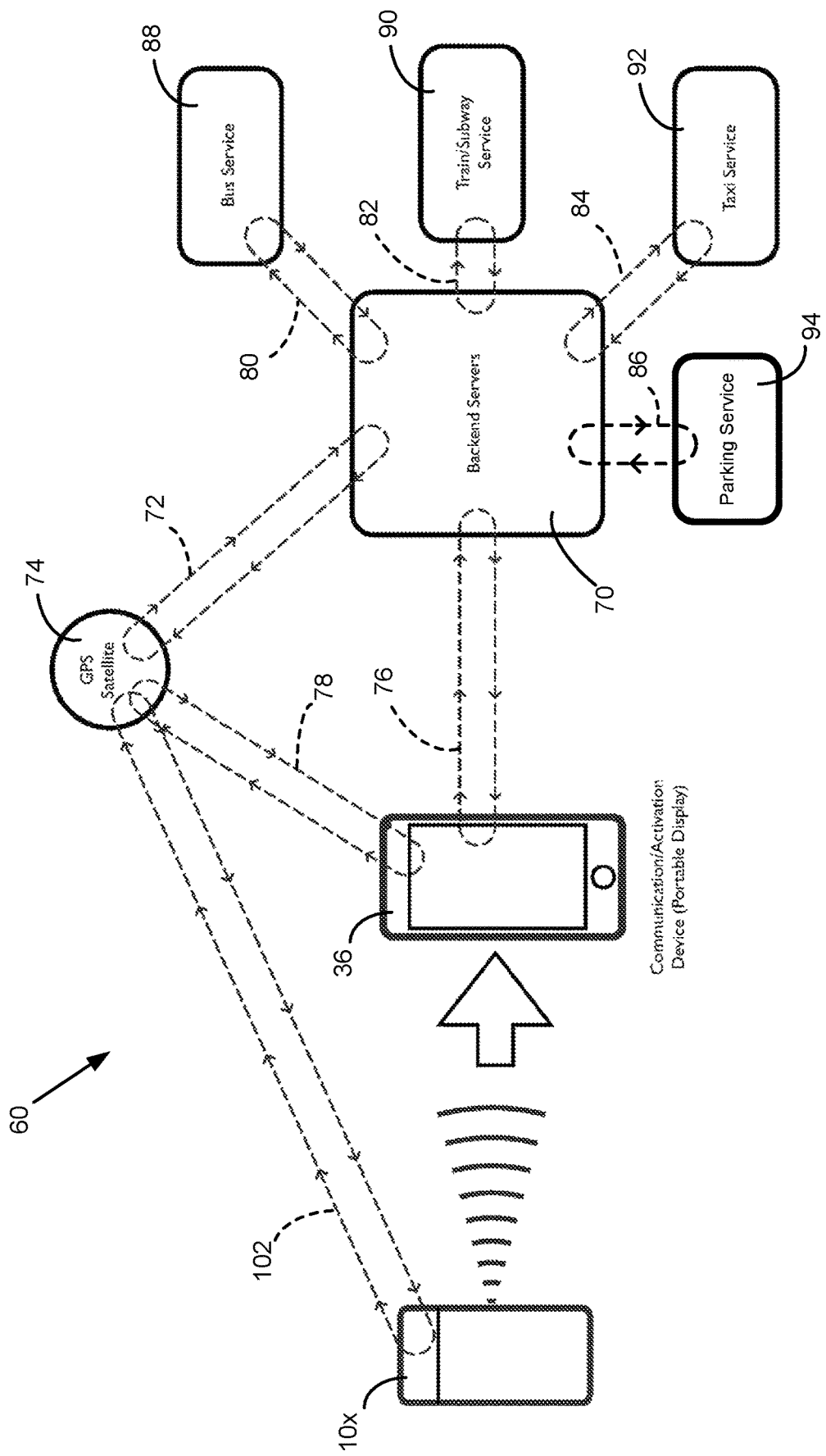

FIGS. 6, 7, and 8 show system 60 including beacon 10. With reference to FIGS. 6, 7, and 8, the radio signal produced by Bluetooth® signal interface module 32 is used to establish a wireless communication link 100 (FIG. 7) between beacon 10 and smartphone 36. Beacon 10 is implemented with LTE communication signal interface module 38 to establish a wireless radio communication link 102 with GPS navigation system 74 to determine and provide to backend servers 70 information about the location and movement of beacon 10.

The following describes the operation of vehicle parking and mass transport beacon system 60. With reference to FIG. 6, a customer's smartphone 36 is loaded with the Citifyd App provided by the operator of system 10, and backend servers 70 store account information for a transaction account set up by the customer. To enter a parking gate or board a bus, taxi, subway, train, or other transportation vehicle, the customer taps on the screen of smartphone 36 to select an intended activity from an on-screen menu display of parking or mode of transportation activities, which are shown in the diagram of a menu screenshot presented as FIG. 5. After the customer taps the selected activity displayed, GPS navigation system 74 recognizes the location of customer smartphone 36, and perforce the location of the customer carrying it, and, in the case of mass transit travel, directs the Citifyd App operating on customer smartphone 36 to open an App of the local transportation agency to provide the customer with travel routes, maps, schedules, and timetables. At the same time, backend servers 70 check the customer account for authenticity, available funds, and credits and thereafter opens the account. If the account is in good order, backend servers 70 issue a "start session" identification code and create within customer smartphone 36 an authorization screen/ticket that is hidden from the customer's access and view. (The terms "parking pass" and "parking ticket" are used interchangeably throughout.) This procedure reduces the possibility of fraud because the customer cannot duplicate the authorization screen by photographing the authorization screen image and sharing it with others. The customer is now ready to board a vehicle of any of the modes of transportation or park at any gated or attended parking locations that are part of system 60.

As a customer moves toward the transportation vehicle or parking gate or attendant, an entry beacon 10e detects customer smartphone 36 at about 30-45 ft (10.7-13.7 m) and prepares for a connection handshake 104. With reference to FIG. 7, at a preset distance (e.g., 2 ft (0.6 m)) a connection handshake between entry beacon 10e and customer smartphone 36 is made instantly on communication link 100 through the Bluetooth protocol. If the identification/shared codes match, authentication is completed, the authorization is presented on the screen of smartphone 36, and indicator lights 14 on entry beacon 10e turn on, signaling the vehicle driver or gate attendant to allow customer entry or boarding. In the case of a barrier gate, instead of indicator lights 14 turning on, entry beacon 10e signals the barrier to be lifted, allowing the customer's vehicle to pass through. At this moment, the identification code also turns to a "stop session" identification code.

Figure 8A:
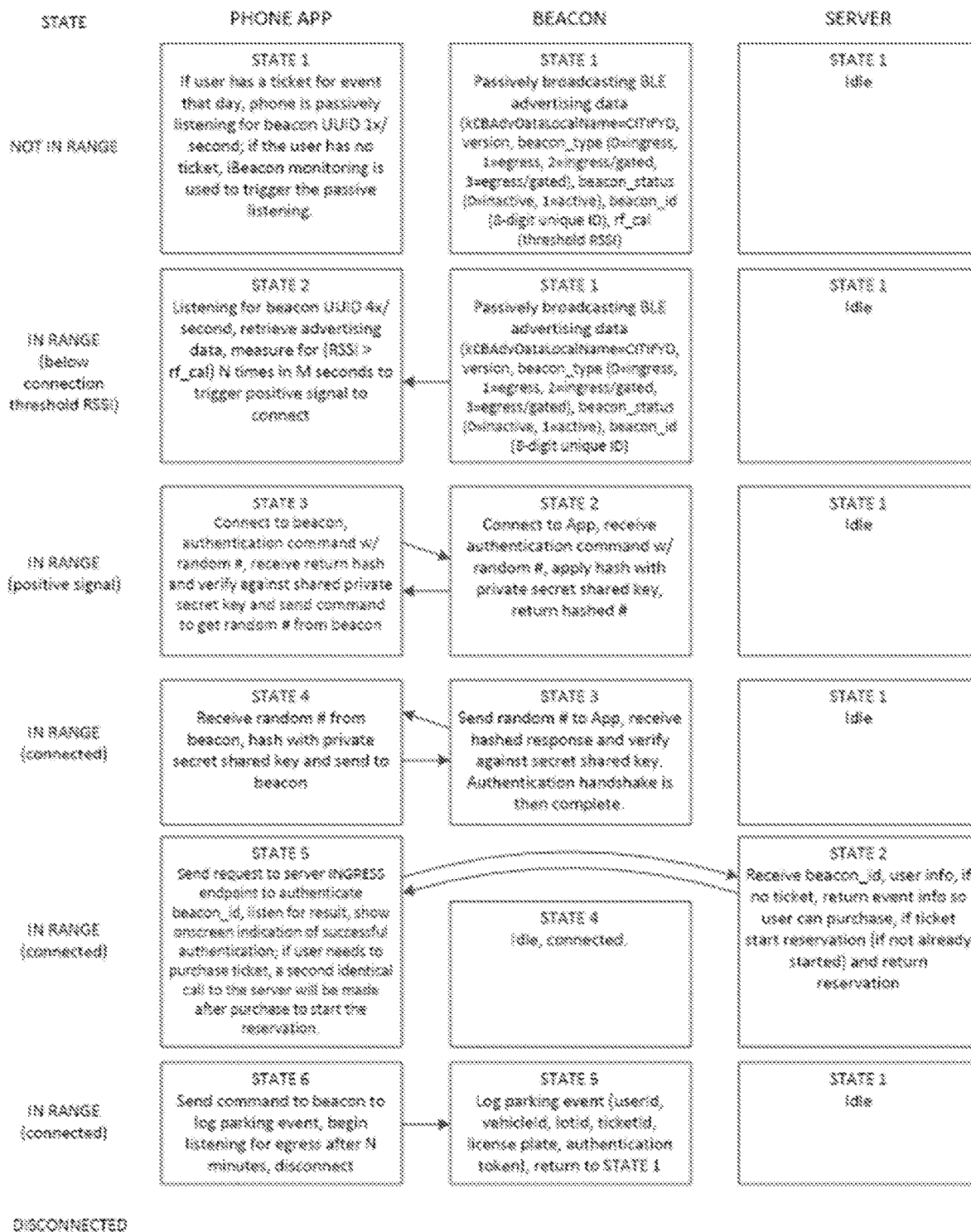
FIGS. 8A and 8B are diagrams outlining logic state flow of an entry beacon and a customer smartphone on which there is, respectively, Internet capability and no Internet capability implemented for processing ingress of a vehicle to a parking facility.
Figure 8B:
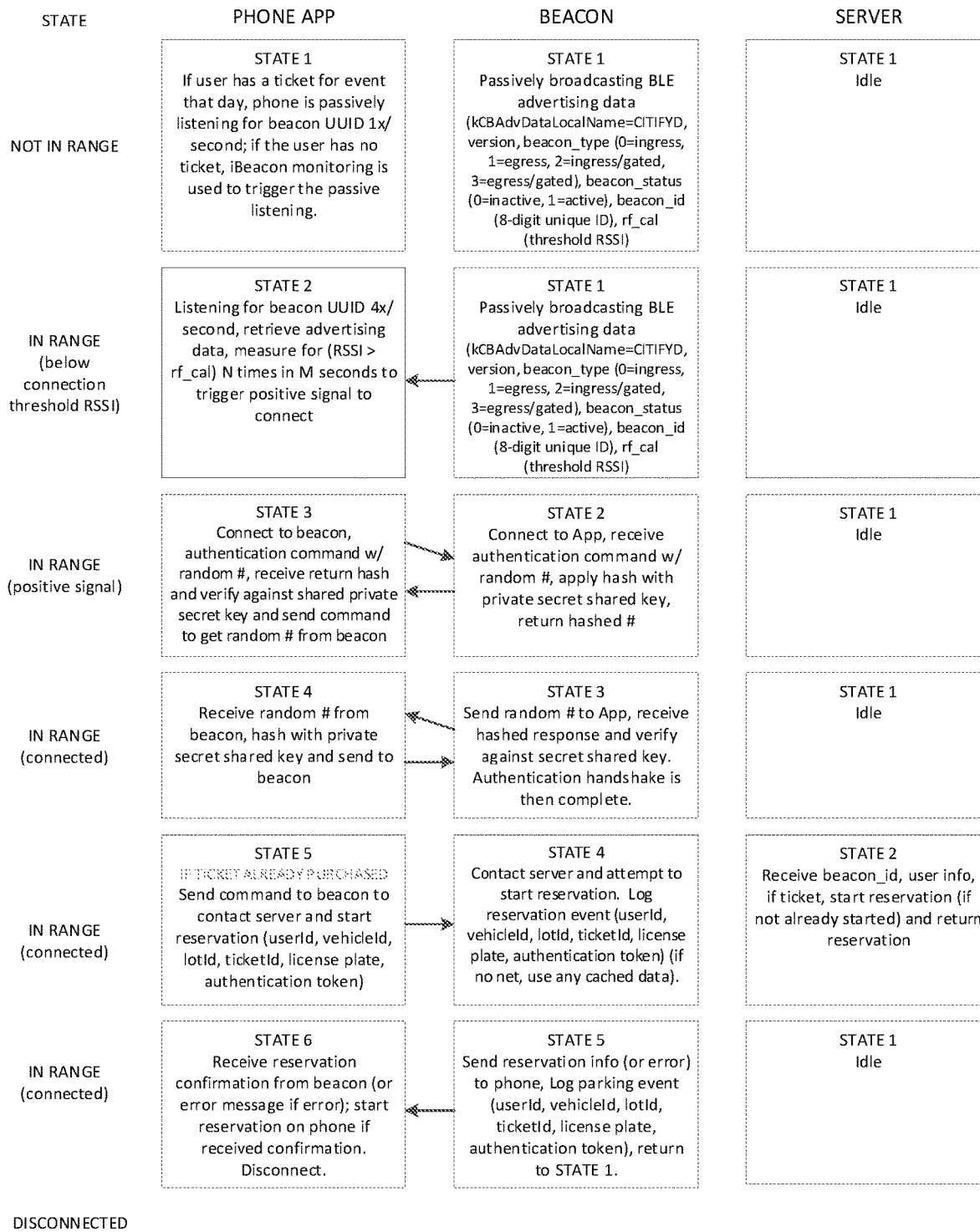

FIGS. 8A and 8B are diagrams outlining the logic state flow of the beacon and customer smartphone for parking ingress, in which there is, respectively, Internet capability and no Internet capability implemented on the customer smartphone.

With reference to FIGS. 6, 7, and 8, after the completion of travel or the vehicle parking session, as the customer disembarks the vehicle or departs from the parking surface lot or facility, an exit beacon 10x (which could be the same as entry beacon 10e if disembarkation or departure takes place through the entry door or gate) detects the approach of the customer and prepares for connection handshake 104 (FIG. 6) and connection on connection link 100 (FIG. 7). At the present distance, connection handshake 104 is made (FIG. 6). If the identification/shared codes match, and as soon as the connection handshake on communication link 100 is broken and GPS navigation system 74 detects separation of beacon 10x (FIG. 8), the system finishes the travel or parking session (in the case of parking, the barrier gate is lifted) and the account is closed and charged appropriately. A confirmation screen with the details of the transaction is presented on customer smartphone 36.

Alternatively, as soon as GPS navigation system 74 detects the separation of beacon 10x from customer smartphone 36 with a "stop session" identification code (FIG. 8), the system finishes the travel/parking session, and the account is closed and charged appropriately. A confirmation screen with details of the transaction is then presented to the customer.

Figure 8C:
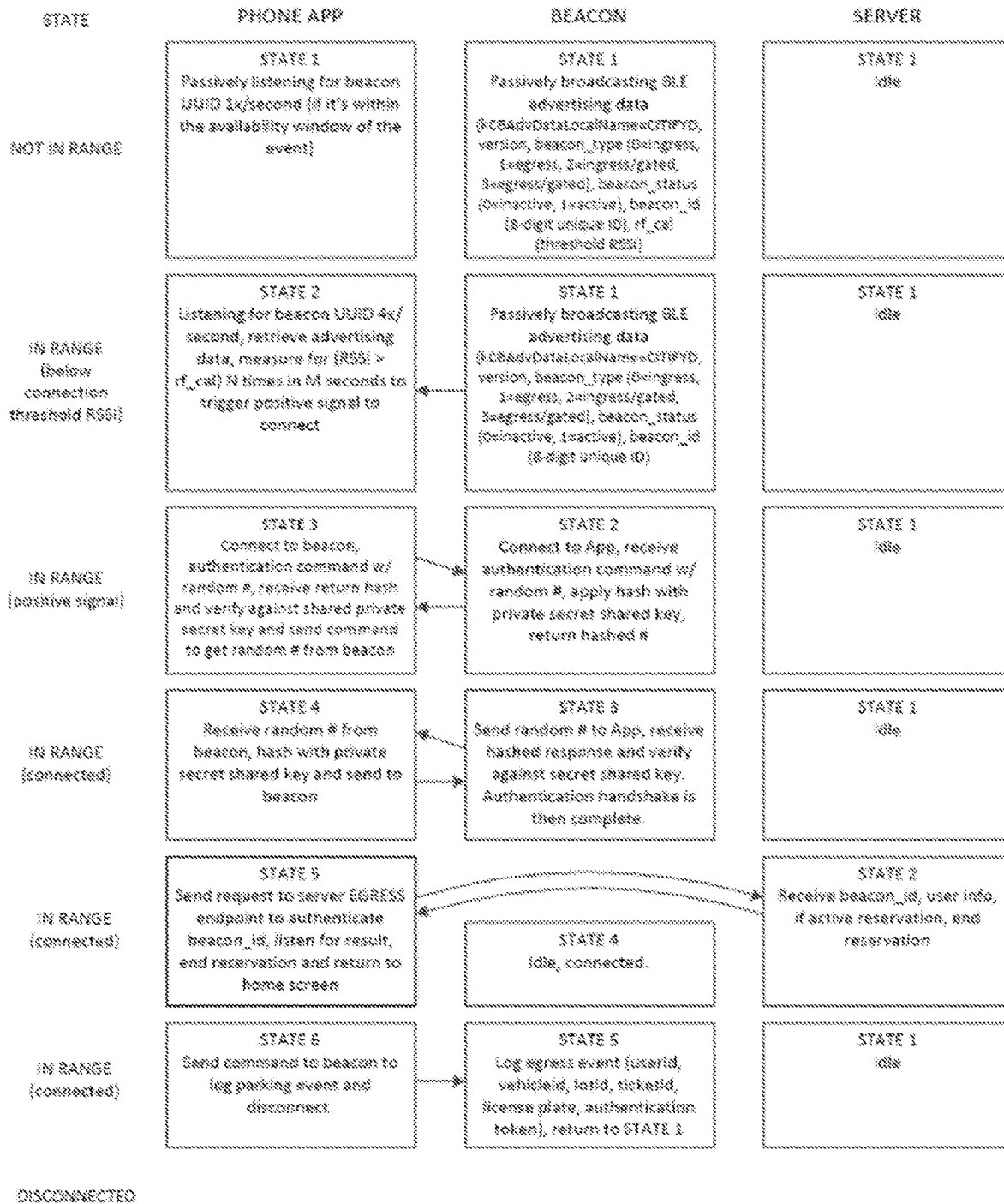
FIG. 8C is a diagram outlining logic state flow of an exit beacon and a customer smartphone for processing egress of a vehicle from a parking facility.

FIG. 8C is a diagram outlining the logic state flow of the beacon and customer smartphone for parking egress.

The process can be repeated multiple times during the day, week, or other set period, and the customer account keeps the tally. At the end of that period, the customer credit card is charged only once.

The system reliance on the cellular or Wi-Fi communication connection at the moment of authorization is eliminated or reduced, and the problem of cellular or Wi-Fi connection delays is removed by (1) performing pre-authorization and account verification before embarking or approaching a parking gate/attendant and within the Citifyd App creating one or both of an identification code and an authorization screen hidden from the customer and (2) verifying the customer/authorization at the moment of entrance or embarkation through the connection handshake with beacon 10 only.

Figures 1, 9:
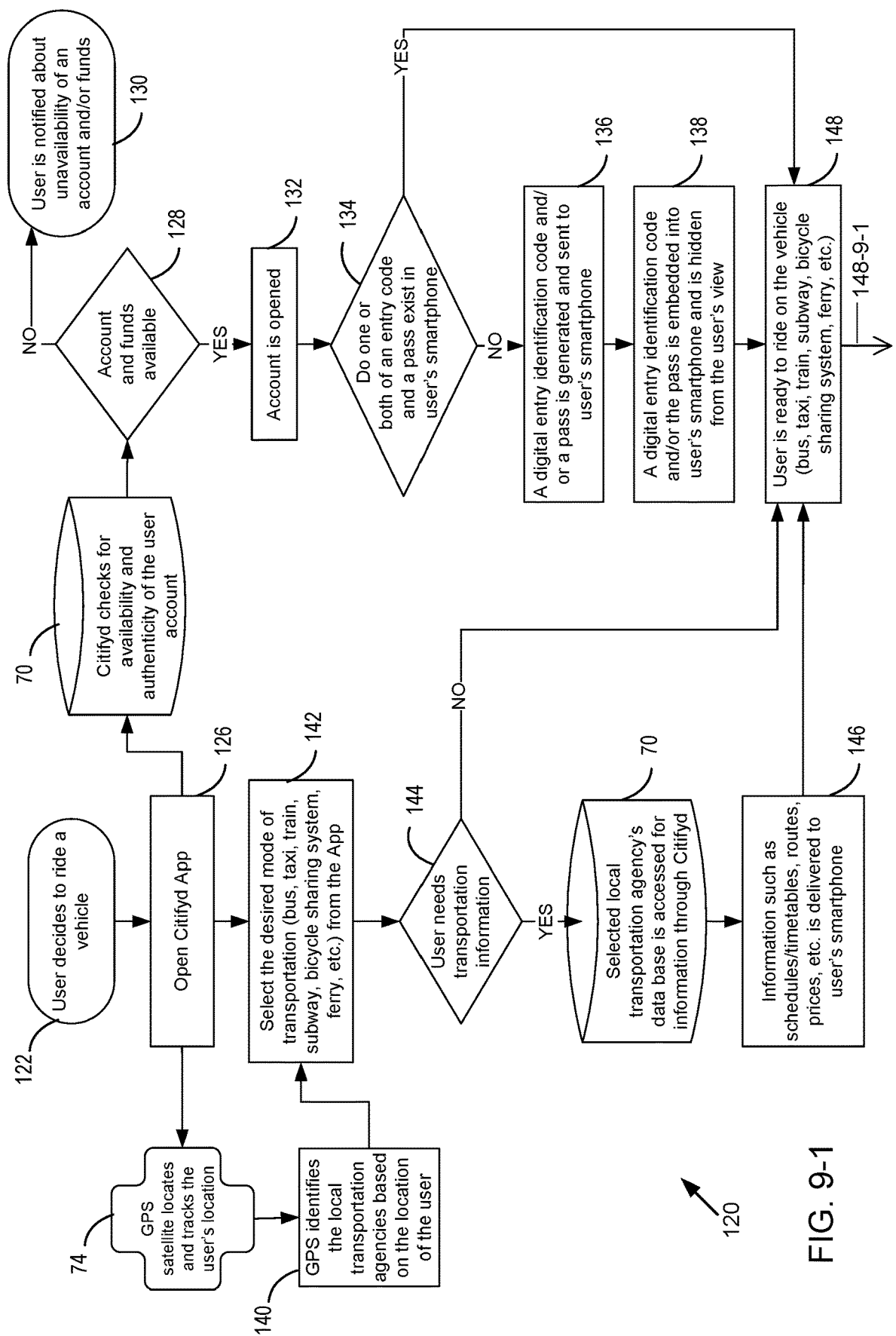
Figures 2, 9:
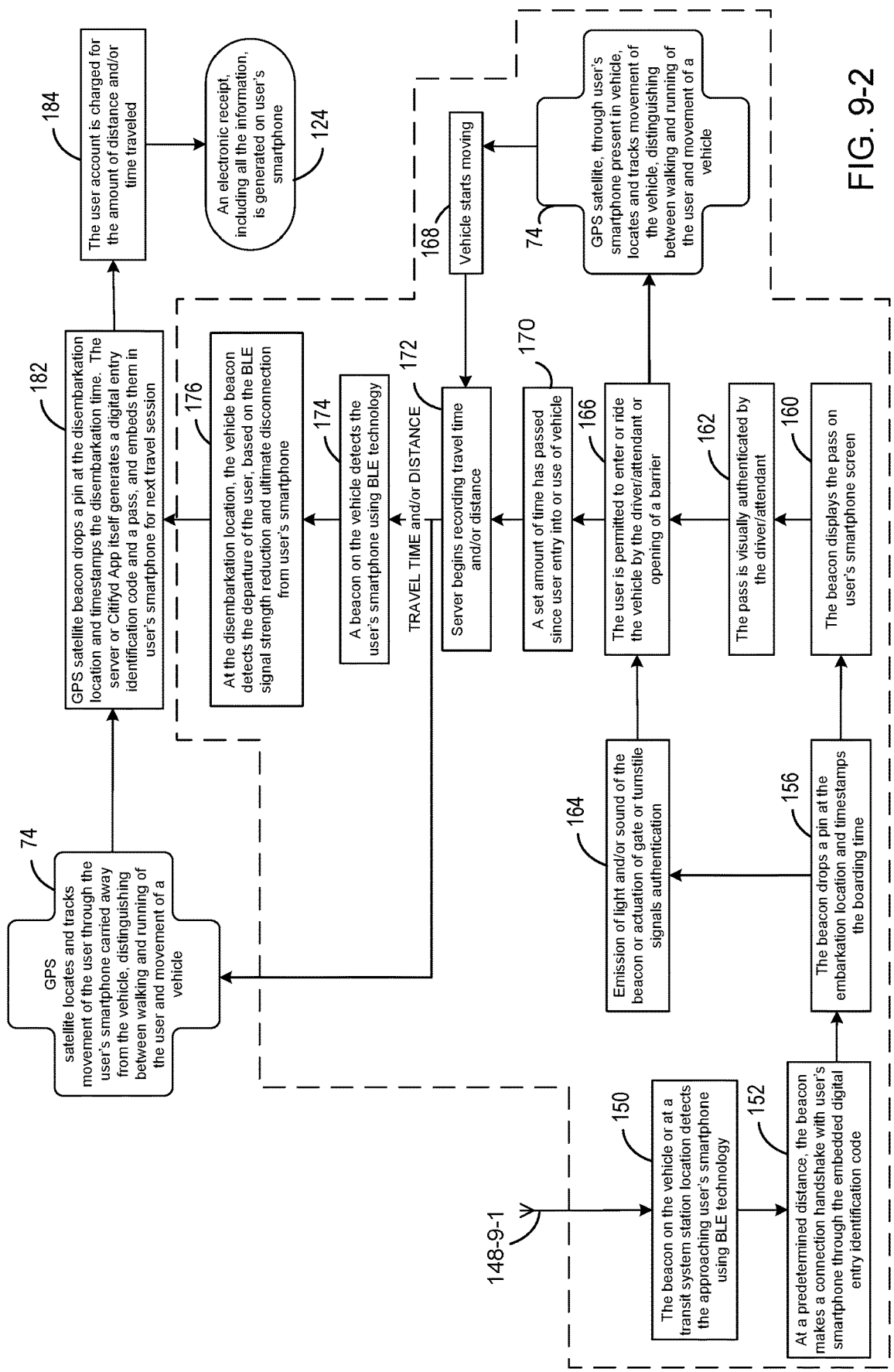

FIGS. 9-1 and 9-2 form an annotated flow diagram 120 outlining and describing the process steps performed in the operation of vehicle parking and mass transport beacon system 60 in the entry into and exit from a mass transit vehicle 58, such as, for example, a bus, taxi, train, subway, bicycle from a bicycle sharing system, ferry, or other such vehicle. The process flow begins with a transit system rider (also referred to as user) deciding, at process block 122, to ride a vehicle and ends the ride with generation, at process block 124, of an electronic receipt presenting all transaction information on user smartphone 36.

To select a desired mode of transportation, a transit rider opens, at decision block 126, the "Citifyd App" operating on user smartphone 36. FIG. 9-1 shows that this selection by the transit rider results in operation of the Citifyd App to perform (1) user account authentication and processing and (2) transportation mode logistics processing.

With respect to user account authentication and processing, backend servers 70 check whether an authentic account is available for the transit rider. Backend servers 70 determine, at decision block 128, whether a user account exists and, if so, whether it contains a minimum account balance of available funds. If either no user account exists or there are insufficient funds available, backend servers 70 send, at process block 130, to user smartphone 36 notification to the transit rider that payment processing using system 60 cannot proceed. If a user account exists and contains sufficient funds, backend servers 70, at process block 132, open the user account and, at decision block 134, determine whether one or both of a digital entry identification code and a pass are stored on user smartphone 36. A negative response to this determination causes backend servers 70, at process block 136, to generate and send to user smartphone 36 one or both of a digital entry identification code and a pass. Whether a transit rider needs one or both of an entry identification code and a pass depends on the mode of authentication required at the transit vehicle entry point. Process block 138 indicates that the digital entry identification code, pass, or both, are embedded in, but not available for visual display on the screen of, user smartphone 36.

With respect to transportation mode logistics processing, upon the opening of the Citifyd App at process block 126, GPS navigation system 74 finds and tracks the location of user smartphone 36 carried by the transit rider and identifies, at process block 140, local transportation agencies based on the location of transit rider. The user location-based local transportation agency information is delivered to user smartphone 36 over communication link 78. The transit rider selects, at process block 142, from the Citifyd App, a desired mode of transportation, such as, for example, bus, taxi, train, subway, bicycle sharing system, or ferry. The Citifyd App inquires, at decision block 144, whether the transit rider needs transportation information, and upon the transit rider's affirmative response, receives, at process block 146, timetables, schedules, routes, fares, and other transportation related information accessed from the database of the selected transportation agency and delivered through backend servers 70 over communication link 76. Process block 148 shows that, after user smartphone 36 has one or both of an embedded digital entry identification code and pass, and the transit rider has received or has no need for transit schedule and cost information, the transit rider is ready to ride on the selected mass transit vehicle.

FIG. 9-2 shows the process flow from the time the transit rider boards or starts to ride, to the time the transit rider leaves, the selected mass transit vehicle. With respect to processing the conveyance of a transit rider, beacon 10 installed on transit vehicle 58 detects, at process block 150, BLE technology-enabled user smartphone 36 of the transit rider approaching transit vehicle 58. Other installation locations of beacon 10 are possible. A first example is the case of a subway system, in which beacon 10 could be installed at a turnstile or gate location of a subway system station. A second example is the case of a bicycle sharing system, in which beacon 10 could be installed on a sharing system bicycle or at a bicycle pick-up or drop-off station terminus. Beacon 10 installed on the bicycle could be powered by a battery that is charged as the bicycle rider pedals. At a predetermined threshold distance between beacon 10 and user smartphone 36, beacon 10 makes, at process block 152, a connection handshake with user smartphone 36 through its embedded digital entry identification code. Beacon 10 thereafter, at process block 156, drops a pin at the transit rider's embarkation location and timestamps the transit rider's boarding time. Having already opened the user account, backend servers 70 start processing and keep track of travel time and distance and other pertinent information.

The next processing step performed depends on whether the selected transit mode is configured for user smartphone 36 to display a pass for a transit system driver/attendant 50 to inspect to authenticate, or to emit light or sound authenticating, or to open a gate or unlock a turnstile to admit the transit rider for passage. Whenever a pass is to be displayed, the display screen of user smartphone 36 presents, at process block 160, the pass for visual inspection. Process block 162 represents visual authentication of the pass by transit system driver/attendant 50. Whenever authenticating light or sound is to be emitted, or a gate or a turnstile barrier is to be activated, user smartphone 36 signals, at process block 164, authentication by emitting light or sound, for recognition by transit driver/attendant 50, or by opening a gate or unlocking a turnstile, for admitting the transit rider. Upon authentication by display of a pass to or visual or auditory recognition by transit driver/attendant 50, or by opening of a gate or turnstile barrier, the transit rider receives, at process block 166, permission to enter or ride the mass transit vehicle. In the specific case of a bicycle, after authentication, the bicycle beacon 10 or station terminus beacon 10 mechanically unlocks the bicycle from a bicycle parking rack and releases the bicycle for use.

The transit rider embarking transit vehicle 58 initiates two processes that cause backend servers 70 to begin recording one or both of transit vehicle travel time and distance. The first process entails GPS navigation system 74 locating and tracking of user smartphone 36, which is present in or carried by the transit rider in or on transit vehicle 58 as it moves. The operation of GPS navigation and motion sensors such as an accelerometer and a pedometer installed in user smartphone 36 enable distinguishing between walking and running movements of the transit rider and movement of transit vehicle 58. Process block 168 indicates detection of movement of transit vehicle 58. The second process entails a timer determining, at process block 170, when a set amount of time has passed from the time the transit rider received permission to enter or use transit vehicle 58. An operational failure of communication link 78 with GPS navigation system 74 in carrying out the first process would not be fatal in the recording of one or both of transit vehicle travel time and distance because the second process is independent of and carried out separately from the first process.

Upon one or both of detection of movement of transit vehicle 58 and passage of the set amount of time after the receipt of authorization, backend servers 70 start, at process block 172, recording one or both of the travel time and distance from the location where the authorization connection took place. There may be several beacons 10 on transit vehicle 58, such as a bus, subway car, or ferry vessel. Each beacon 10 is identified by its own unique identifier (UID), but the beacons share the same transit vehicle UID. The sharing of the same vehicle UID by beacons 10 enables system 60 to maintain identification of a transit rider while walking through the same transit vehicle 58 and forming connection handshakes between user smartphone 36 and each of the several beacons 10 installed on transit vehicle 58. A connection between user smartphone 36 and a beacon 10 during conveyance of the transit rider inside transit vehicle 58 has no effect on opening and closing of a user account and calculation of either a distance or fare.

Upon conclusion of the transit rider's time of travel, the nearest one of the several beacons 10 installed on transit vehicle 58 detects, at process block 174, the approaching user smartphone 36 of the transit rider proceeding to disembark transit vehicle 58. The Citifyd App operating on user smartphone 36 is programmed to select for connection handshake the beacon 10 located nearest to user smartphone 36 as the transit rider moves about transit vehicle 58. At a predetermined distance between the nearest beacon 10 and user smartphone 36, the nearest BLE technology-enabled beacon 10, based on BLE signal strength reduction and ultimate disconnection from user smartphone 36, detects, at process block 176, departure of user smartphone 36 as the transit rider carries it away from transit vehicle 58. The operation of GPS navigation and the accelerometer and pedometer sensors installed in user smartphone 36 carried outside of transit vehicle 58 distinguish between walking and running movements of the transit rider and movement of the vehicle. In the specific case of a bicycle, the rider's locking the bicycle parked at the station terminus rack can alternatively be used to signal conclusion of the rider's time of travel.

Once a predetermined distance is reached separating the nearest beacon 10 installed on transit vehicle 58 and user smartphone 36, the BLE signal between them is disconnected, and GPS navigation system 74 locating and tracking the location of the transit rider drops, at process block 182, a pin at the disembarkation location and timestamps the disembarkation time of the transit rider. Backend servers 70 generate a digital entry identification code and pass and embeds them in user smartphone 36 for use in a next travel session. Alternatively, the Citifyd App itself could generate through a binary system an alternate sequence of an entrance code and an exit code. Upon effecting a connection handshake for operating an entrance code, the Citifyd App thereafter generates an exit code for later use in system processing. Similarly, upon effecting a connection handshake for operating an exit code, the Citifyd App thereafter generates an entrance code. System 60 calculates from one or both of the distance traveled and the elapsed time of travel a transit fare amount and, at process block 184, charges that amount to the transit rider customer account residing in backend servers 70. As stated above, processing of the conveyance of the transit rider ends with generation, at process block 124, of an electronic receipt, presenting all pertinent information, on user smartphone 36.

Transit vehicle 58 has its own UID. When user smartphone 36 connects with one or more beacons of another transit vehicle, system 60 recognizes one or more of a change in route, the vehicle type, and a new transaction.

FIGS. 10-1 and 10-2 form an annotated flow diagram 220 outlining and describing the process steps performed in the operation of vehicle parking and mass transport beacon system 60 for a vehicle entering into and exiting from a gated parking facility (e.g., parking garage structure or surface lot) using beacon 10 attached to a barrier gate. The process flow begins with a vehicle driver (also referred to as user) deciding, at process block 222, to enter a gated garage or surface lot and ends with generation, at process block 224, of an electronic receipt presenting all transaction information on user smartphone 36, followed by production, at process block 226, of a new digital entry code generated for the next gate entry and sent to user smartphone 36.

FIG. 10-1 shows that this decision causes the vehicle driver user to open, at process block 126, the Citifyd App to perform user account authentication and processing. Upon opening the Citifyd App, GPS navigation system 74 finds and tracks the location of user smartphone 36 carried by the vehicle driver.

With respect to user account authentication and processing, backend servers 70 check whether an authentic account is available for the vehicle driver. Backend servers 70 determine, at decision block 128, whether a user account exists, and, if so, whether it contains a minimum account balance of available funds. If either no user account exists or there are insufficient funds available, backend servers 70 send, at process block 130, to user smartphone 36 notification to the vehicle driver that payment processing cannot proceed. If a user account exists and contains sufficient funds, backend servers 70, at process block 132, open the user account and, at process block 236, generate and send to user smartphone 36 a digital entry identification code. Process block 248 shows that, after user smartphone 36 has embedded a digital entry identification code, the vehicle driver is ready to enter the gated parking garage or surface lot.

FIG. 10-2 shows the process flow from the time the vehicle operated by the vehicle driver enters, to the time the vehicle operated by the vehicle driver exits, the gated parking garage or surface lot. Beacon 10 mounted on the entrance gate at the garage or surface lot entrance detects, at process block 250, BLE technology-enabled user smartphone 36 accompanying the vehicle driver as the vehicle approaches the entrance gate. The presence of user smartphone 36 in the vehicle approaching the entrance gate affords two alternative ways for authenticating the vehicle driver for entry. In a first alternative, at a predetermined distance between beacon 10 and user smartphone 36, beacon 10 makes, at process block 252, a connection handshake with user smartphone 36 through its embedded digital entry identification code. In a second alternative, user smartphone 36 responds to detection of emissions from beacon 10 by generating, at process block 253e1, an activate button in the form of an "Activate Gate" button image on the smartphone display screen. The generation of the Activate Gate button is described below with reference to FIGS. 19A-19E, and especially FIG. 19D. The vehicle driver actuates, at process block 253e2, the "Activate Gate" button to transmit to beacon 10 a signal to open the entrance gate. In response to the connection handshake of process block 252 or the signal of process block 253e2, beacon 10 signals, at process block 254, authentication of the vehicle driver by opening the gate. Beacon 10 thereafter, at process block 256, drops a pin at the entrance gate location and timestamps the vehicle driver's time of entry into the parking garage or surface lot and, at process block 258, generates a digital exit identification code and embeds it in user smartphone 36.

Upon conclusion of a vehicle parking session, beacon 10 mounted on the exit gate detects, at process block 274, the approaching BLE technology-enabled user smartphone 36 of the vehicle driver. (Skilled persons will appreciate that only one gate on which beacon 10 is mounted could be used for both entrance to and exit from a parking garage or surface lot.) The presence of user smartphone 36 in the vehicle approaching the exit gate affords two alternative ways for authenticating the vehicle driver for exit. In a first alternative, at a predetermined distance between beacon 10 and user smartphone 36, beacon 10 makes, at process block 276, a connection handshake with user smartphone 36 through its embedded digital exit identification code. In a second alternative, user smartphone 36 responds to detection of emissions from beacon 10 by generating, at process block 277x1, and "Activate Gate" button image on the smartphone display screen. The vehicle driver actuates, at process block 277x2, the "Activate Gate" button to transmit to beacon 10 a signal to open the exit gate. In response to the connection handshake of process block 276 or the signal of process block 277x2, beacon 10 signals, at process block 278, authentication of the vehicle driver by opening the exit gate to clear the way for the vehicle to leave the parking garage or surface lot. BLE technology-enabled beacon 10 detects, at process block 280, departure of user smartphone 36 as the vehicle driver drives the vehicle away from the exit gate.

Once a predetermined distance is reached between user smartphone 36 and beacon 10 installed on the exit gate, GPS navigation system 74 locating and tracking the location of the vehicle driver drops, at process block 282, a pin at the exit location and timestamps the exit time of the vehicle driver. System 60 calculates from the elapsed time of the parking session a parking fee amount and, at process block 284, charges that amount to the vehicle driver customer account residing in backend servers 70. As stated above, processing of the parking session ends with generation, at process block 224, of an electronic receipt on user smartphone 36. A new digital entry identification code is generated, at process block 226, for the next gate entry and is sent to user smartphone 36.

Each of flow diagrams 120 and 220 has an area defined by dashed lines, which area indicates activities performed by vehicle parking and mass transport beacon system 60 in absence of connection to a cellular or Wi-Fi communication network from the moment of authorization to the moment of disconnection of user smartphone 36 upon departure of the transit rider from a transit vehicle or exit of the vehicle from a parking garage or surface lot. This capability afforded by use of communication between beacon 10 and customer smartphone 36 avoids delay and communication coverage issues stemming from use of a cellular or Wi-Fi communication network.

Figure 11:
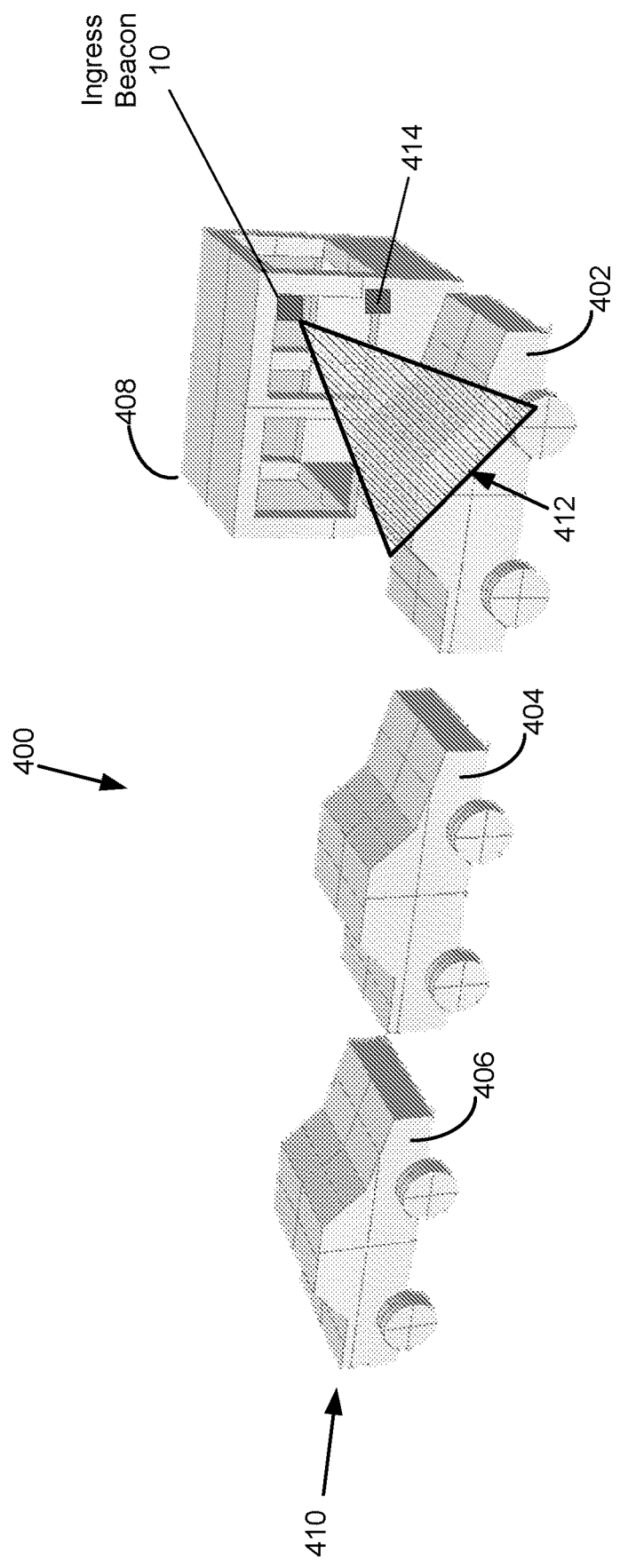
FIGS. 11, 12, and 13 are pictorial diagrams illustrating source beacon placement for detecting, respectively, vehicles entering, vehicles exiting, and vehicles entering and exiting a parking area.
Figure 12:
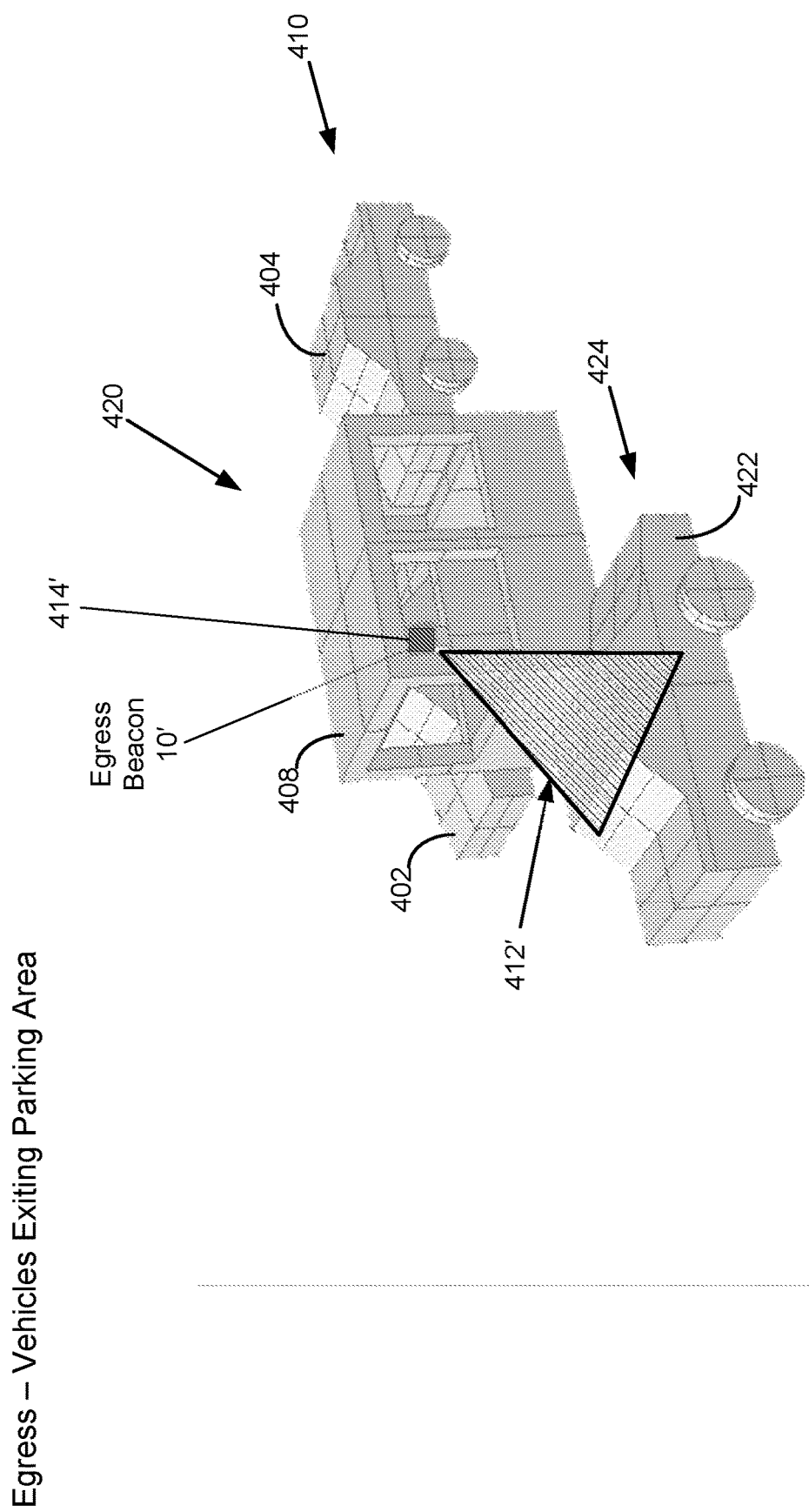
Figure 13:
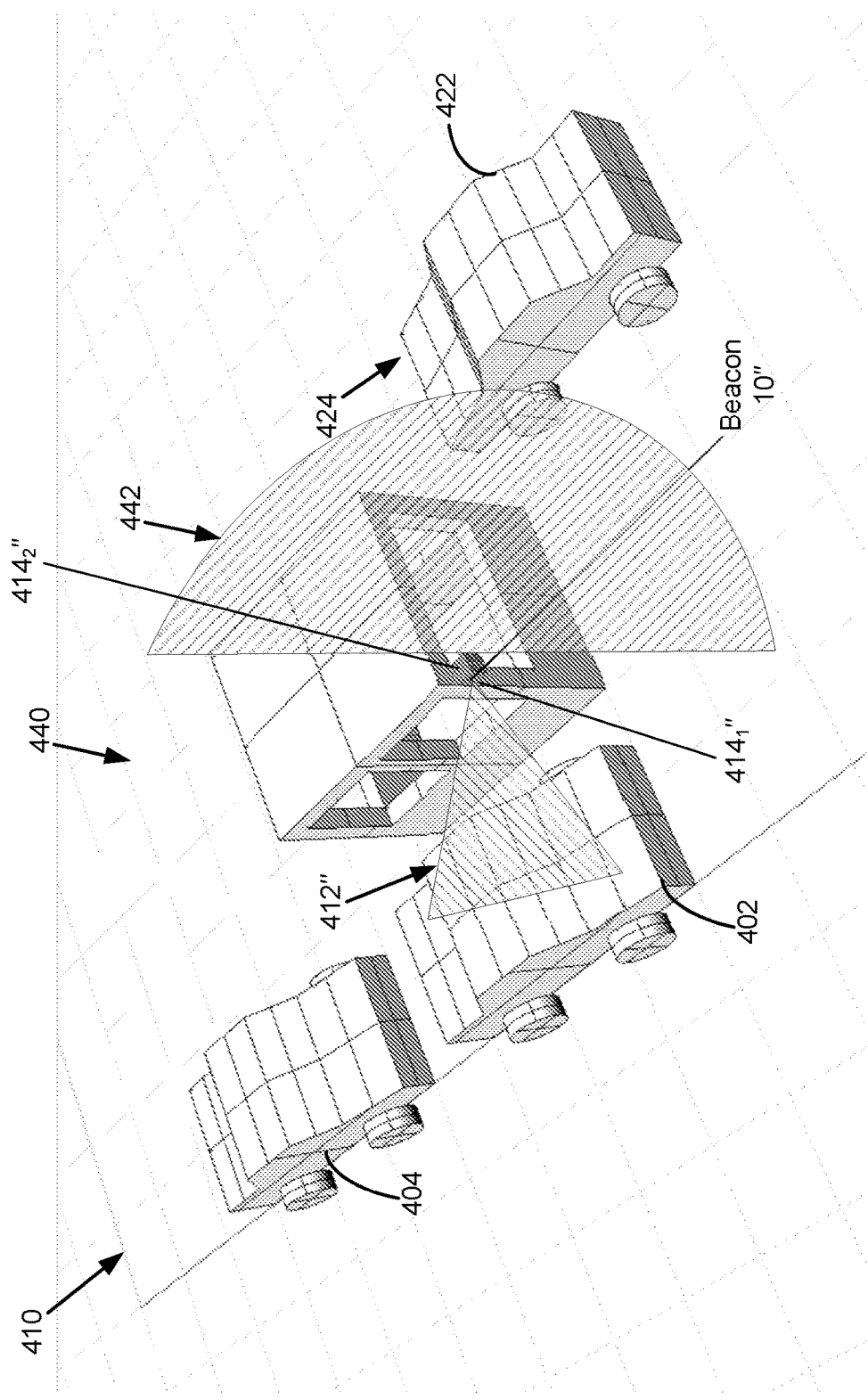
Figure 14:
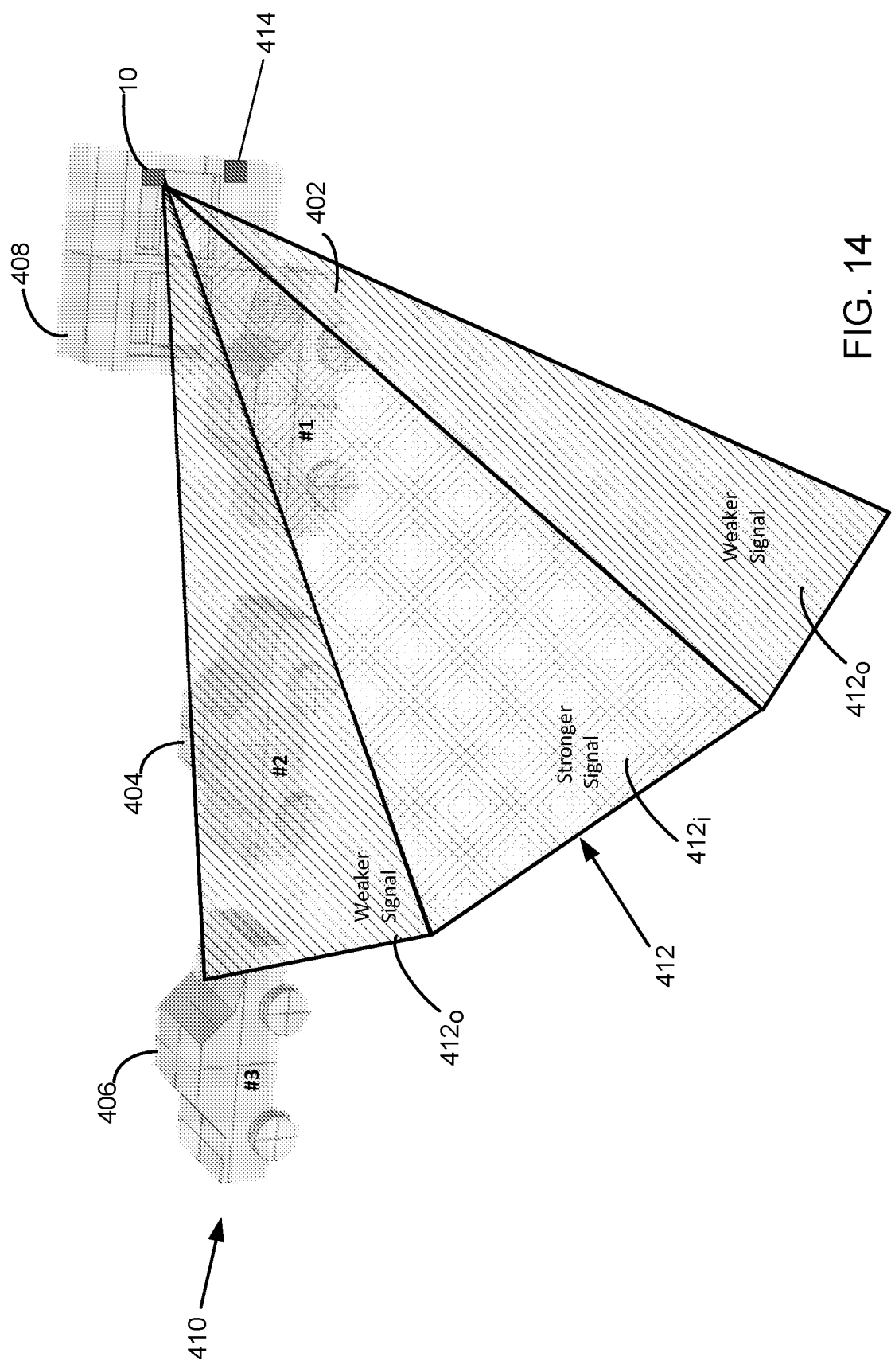
FIG. 14 is a pictorial diagram showing an antenna radiation pattern of the source beacon shown in FIG. 11, in which the radiation pattern is tailored to virtually eliminate premature detection by a vehicle before its turn to check-in a parking area.

FIGS. 11, 12, and 13 are pictorial diagrams illustrating source beacon placement for detecting, respectively, vehicles entering (ingress beacon), vehicles exiting (egress beacon), and vehicles entering and exiting (combined ingress/egress beacon) a parking area. FIG. 14 illustrates an antenna radiation pattern tailored to virtually eliminate premature detection by a vehicle before its turn to check-in the parking area.

FIG. 11 illustrates a vehicle ingress scenario 400 in which vehicles 402, 404, and 406 in a queue approach a gate or kiosk 408 as they enter a parking area. Beacon 10 is fixed to kiosk 408 to direct RF emissions toward an entry lane 410 along which vehicles entering the parking area travel. Beacon 10 includes a directional antenna that is configured to emit an RF signal in a conical radiation pattern 412. Conical radiation pattern 412 of RF emission limits the region of reception of the Bluetooth® low energy (BLE) signal pointed to vehicle 402, which is positioned nearest to beacon 10. Vehicle 402 is shown in the lead position of the queue including vehicles 404 and 406. The directional antenna is preferably a patch antenna that is positioned to provide line-of-sight RF emissions into vehicle 402.

A magnetometer 414, which detects large masses of metal, is also fixed to kiosk 408 to detect the presence and direction of movement of a vehicle but not the presence of a person. Magnetometer 414 is shown as a separate item fixed to kiosk 408 but may be included inside the housing of beacon 10 to form a single unit. Magnetometer 414 is preferably an HMC5883L three-axis digital compass available from Honeywell International Inc. The three-axis digital compass detects the direction of movement of the vehicle moving in entry lane 410. Placement of magnetometer 414 eliminates a possibility of intentional or accidental activation of a parking facility entrance barrier gate (not shown) upon completion of a connection handshake between beacon 10 and smart device 36, authenticating or validating a vehicle parking account. There is no required sequence of detection by magnetometer 414 of a vehicle moving in entry lane 410 and of the occurrence of the connection handshake and parking account validation. The result of the connection handshake and account validation process and the use of magnetometry is reduced opportunity for fraud or accidental opening of the entrance barrier gate.

The effort to reduce incidence of accident or fraud can be accomplished also by the motion sensor technology, including the accelerometer and pedometer, implemented in smart device 36. Motion sensor technology can be used to distinguish between walking and running movements of the vehicle driver and movement of the vehicle and thereby detect when a vehicle driver carrying smart device 36 attempts to prematurely conclude a vehicle parking session by approaching a parking facility exit barrier gate beacon 10 while the vehicle remains parked in its spot.

FIG. 12 illustrates a vehicle egress scenario 420 in which a vehicle 422 traveling along an exit lane 424 moves past kiosk 408 to exit the parking area. A second beacon 10' fixed at the rear portion of kiosk 408 provides monitoring of vehicles traveling along exit lane 424 to exit the parking area. Beacon 10' includes a directional antenna of the same type as that of beacon 10, emitting an RF signal in a conical radiation pattern 412' similar to conical radiation pattern 412 of beacon 10. A magnetometer 414', which is of the same three-axis type of magnetometer 414 and is shown included in the housing of beacon 10', contributes to eliminating accidental stoppage of elapsed parking time and the parking account. Such stoppage could take place by a customer, while standing at kiosk 408 and away from the parked vehicle, attempting to end a parking session.

FIG. 13 illustrates a combined vehicle ingress/vehicle egress scenario 440 in which a beacon 10" is equipped with two Bluetooth® low energy radios, the first one of which monitoring vehicles 402 and 404 traveling in entry lane 410 and the second one of which monitoring vehicle 422 traveling in exit lane 424. The first BLE radio, monitoring entry lane 410 for vehicle ingress, includes a directional antenna emitting an RF signal in a conical radiation pattern 412", as described with reference to beacon 10 in FIG. 11. The second BLE radio, monitoring exit lane 424 for vehicle egress, includes an omni-directional antenna that is configured to emit an RF signal in a hemispherical radiation pattern 442 of RF emission to monitor vehicles exiting the parking area. Two magnetometers 414$_1$" and 414$_2$", each of the same three-axis type of magnetometer 414, are shown included in the housing of beacon 10" for the same reasons given above for magnetometers 414 and 414'. Magnetometers 414$_1$" and 414$_2$" face toward, respectively, entry lane 410 and exit lane 424 to detect vehicles and their directions of movement.

FIG. 14 illustrates, for the ingress scenario 400 of FIG. 11, sectors of relative signal intensity in conical radiation pattern 412 of RF emission to demonstrate early radiation detection and thresholding by the BLE receiver in smartphone 36 to prevent premature check-in of vehicle 404 or vehicle 406 following behind vehicle 402. Conical radiation pattern 412 of RF emission from beacon 10 has an inner sector 412$_i$ of stronger signal intensity pointed into vehicle 402 and two outer sectors 412$_o$ of weaker signal intensity located adjacent either side of inner sector 412$_i$ and pointed away from the front and rear of vehicle 402. To prevent premature check-in of a trailing vehicle, beacon 10 continually broadcasts a signal-strength calibration signal that indicates minimum and maximum "in-range" signal thresholds. The Citifyd App operating on user smartphone 36 uses the in-range signal values to determine whether a received RF emission from beacon 10 is of sufficient strength to begin communication with beacon 10, in accordance with the above-described procedure.

FIGS. 15, 16, 17, and 18 are block diagrams showing, among the components of the disclosed parking beacon system, various communication links that are active in different system communication scenarios.

Figure 15:
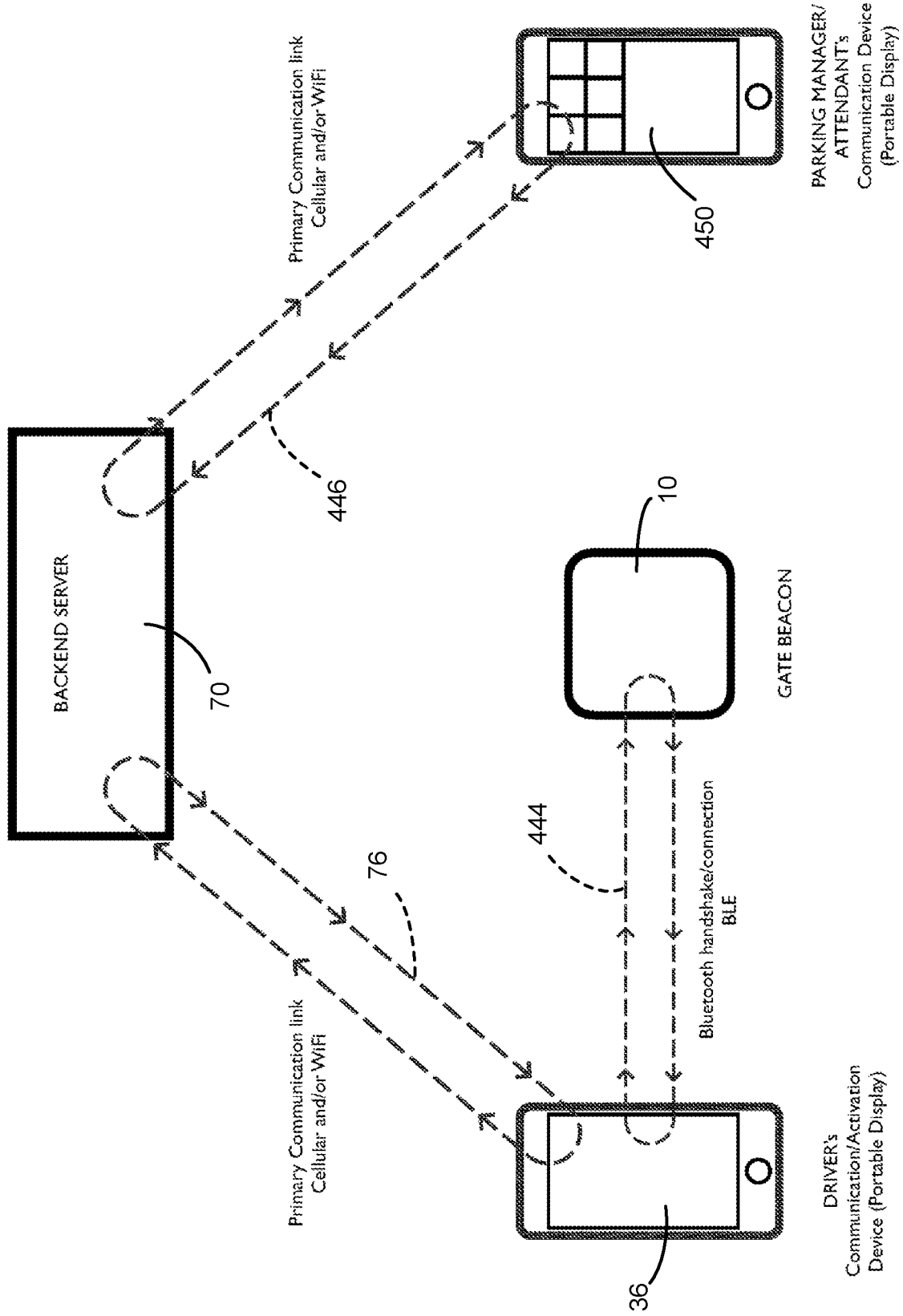
FIGS. 15, 16, 17, and 18 are block diagrams showing, among the components of the disclosed parking beacon system, various communication links that are active in different system communication scenarios.

FIG. 15 illustrates communication links established for a scenario in which user smartphone 36 communicates information to backend servers 70. User smartphone 36 has embedded in its memory stores parking pass and other user identification information available before the approaching vehicle reaches kiosk 408. User smartphone 36 receives the BLE signal to establish a communication link 444 to connect to beacon 10, and a connection handshake (i.e., information transfer) takes place to authenticate or not authenticate the parking pass purchase, to open the parking account, or both. Beacon 10 then uses smartphone 36 to communicate the parking pass and parking account information back to backend servers 70. Backend servers 70 use, as their primary communication link 446, one or both of their cellular and Wi-Fi communication network capabilities to provide real-time inventory and other related parking management information at the same time to an attendant's hand-held device 450 and to other stationary monitoring dashboards.

Figure 16:
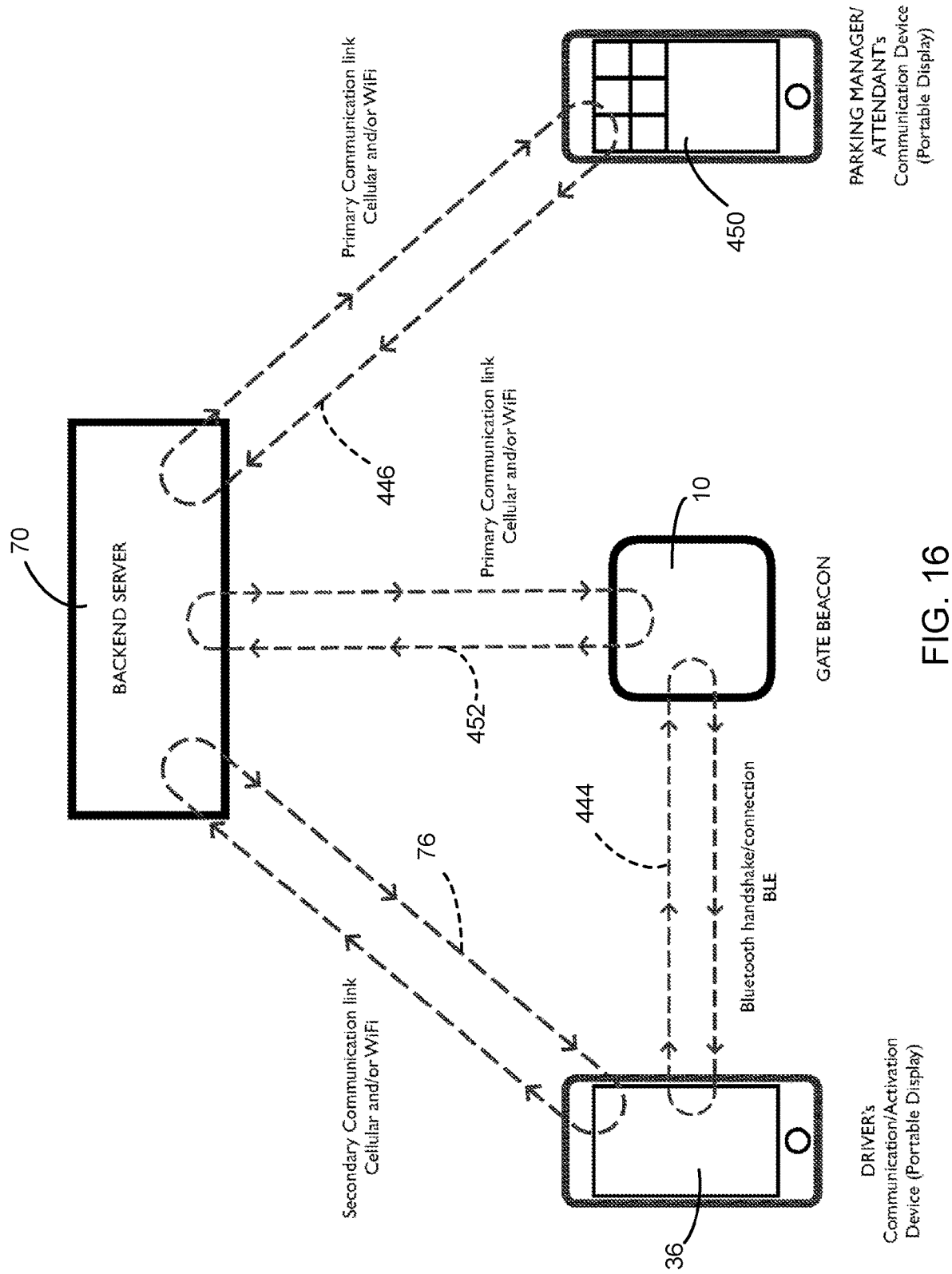

FIG. 16 illustrates communication links established for a scenario in which beacon 10 uses one or both of its Wi-Fi and cellular communication network capabilities to transmit information to backend servers 70. User smartphone 36 has embedded in its memory stores parking pass and other user identification information available before the approaching vehicle reaches kiosk 408. Smartphone 36 receives the BLE signal to establish communication link 444 to connect to beacon 10, and a connection handshake (i.e., information transfer) takes place to authenticate or not authenticate the parking pass purchase, to open the parking account, or both. Beacon 10 uses, as its primary communication link 452, one or both of its own Wi-Fi and cellular communication network capabilities to transmit the information back to backend servers 70. As a backup, the beacon 10 can use, as a secondary communication link 76, one or both of the cellular and Wi-Fi communication network capabilities of smartphone 36 to communicate with backend servers 70. Backend servers 70 use, as their primary communication link 446, one or both of their cellular and Wi-Fi network communication capabilities to provide real-time inventory and other related parking management information at the same time to attendant's hand-held device 450 and to other stationary monitoring dashboards.

Figure 17:
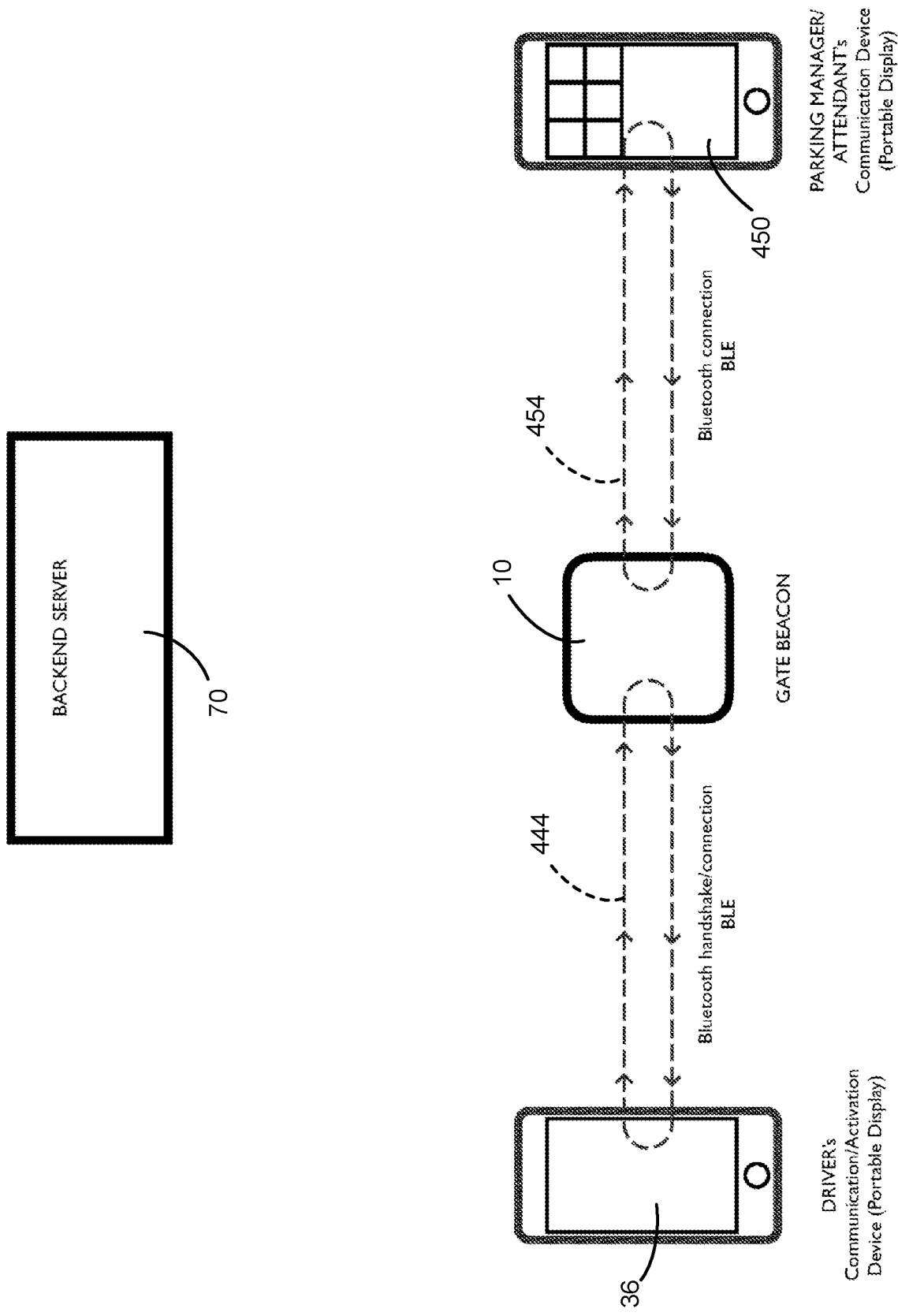

FIG. 17 illustrates communication links established for a scenario in which there is a lack of, or disruption in, communication network connection to backend servers 70. User smartphone 36 has embedded in its memory stores parking pass and other user identification information available before the approaching vehicle reaches kiosk 408. Smartphone 36 receives the BLE signal to connect to beacon 10, and a connection handshake (i.e., information transfer) takes place to authenticate or not authenticate the parking pass purchase, to open the parking account, or both.

Whenever there is a lack of or disruption in communication network connection to backend servers 70, beacon 10, which has stored in its memory, for all parking system users, identification information and parking passes for an event previously uploaded or uploaded and updated every few minutes, can at the same time use BLE connectivity to establish a communication link 454 to communicate and provide real-time inventory and other related parking management information to attendant's hand-held device 450 and other stationary monitoring dashboards in its vicinity. This back-up method is independent from either one or both of cellular and Wi-Fi communication network connectivity and reduces any disruption of authentication during vehicle ingress and egress. Upon restoration of communication network connectivity, the data are transmitted at a later time to backend servers 70 by one or both of beacon 10 and parking attendant's hand-held device 450 for further analysis and permanent storage in backend servers 70.

Figure 18:
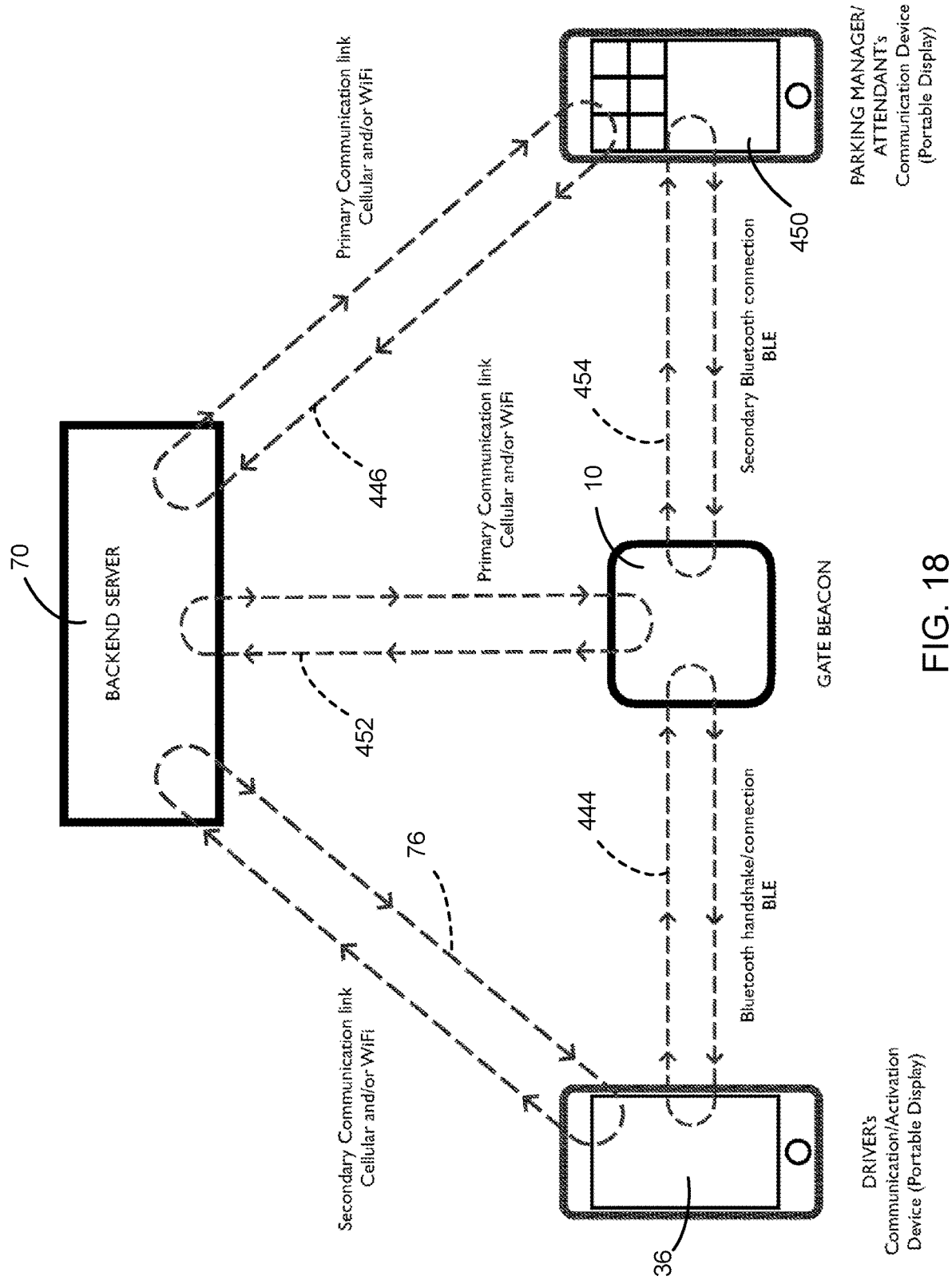

FIG. 18 illustrates communication links established for a scenario in which beacon 10 uses smartphone 36 as a backup to communicate with backend servers 70, the BLE signal connection of beacon 10 to communicate with parking attendant's hand-held device 450, or both. User smartphone 36 has embedded in its memory stores parking pass and other user identification information available before the approaching vehicle reaches kiosk 408. Beacon 10 uses, as its primary communication link 452, one or both of its own Wi-Fi and cellular communication network capabilities to transmit the information back to backend servers 70. As a backup, beacon 10 can also use smartphone 36 to communicate by communication link 76 with backend servers 70, the BLE signal connection 454 of beacon 10 to communicate with parking attendant's hand-held device 450, or both. Backend servers 70 use, as their primary communication link 446, one or both of their cellular and Wi-Fi communication network capabilities to provide real-time inventory and other related parking management information at the same time to parking attendant's hand-held device 450 and to other stationary monitoring dashboards.

FIGS. 19A, 19B, 19C, 19D, and 19E present different processing stages in the implementation of a method of achieving accurate authorization of a vehicle approaching a parking garage or surface lot entrance or exit location. The method is carried out using a gate/attendant (hereafter, gate) beacon 10, backend servers 70, and user smartphone 36 in operative cooperation with communication links 76, 444, and 452 configured as shown in FIG. 16. Each of FIGS. 19A, 19B, 19C, 19D, and 19E shows vehicle 402 at three different locations ($402_3$, $402_2$, and $402_1$) as it approaches gate beacon 10 in the direction indicated by the INGRESS arrow.

With reference to FIG. 19A, gate beacon 10 is equipped with a BLE radio including an omni-directional antenna that is configured to emit an RF signal in hemispherical (180°) radiation pattern 442 of RF emission. Gate beacon 10, using its antenna emitting radiation in the hemispherical radiation pattern 442 and BTLE-GATT technology, can detect user smartphone 36 in vehicle 402 at location $402_3$ from about 70 m away as vehicle 402 approaches gate beacon 10.

Figure 19B:
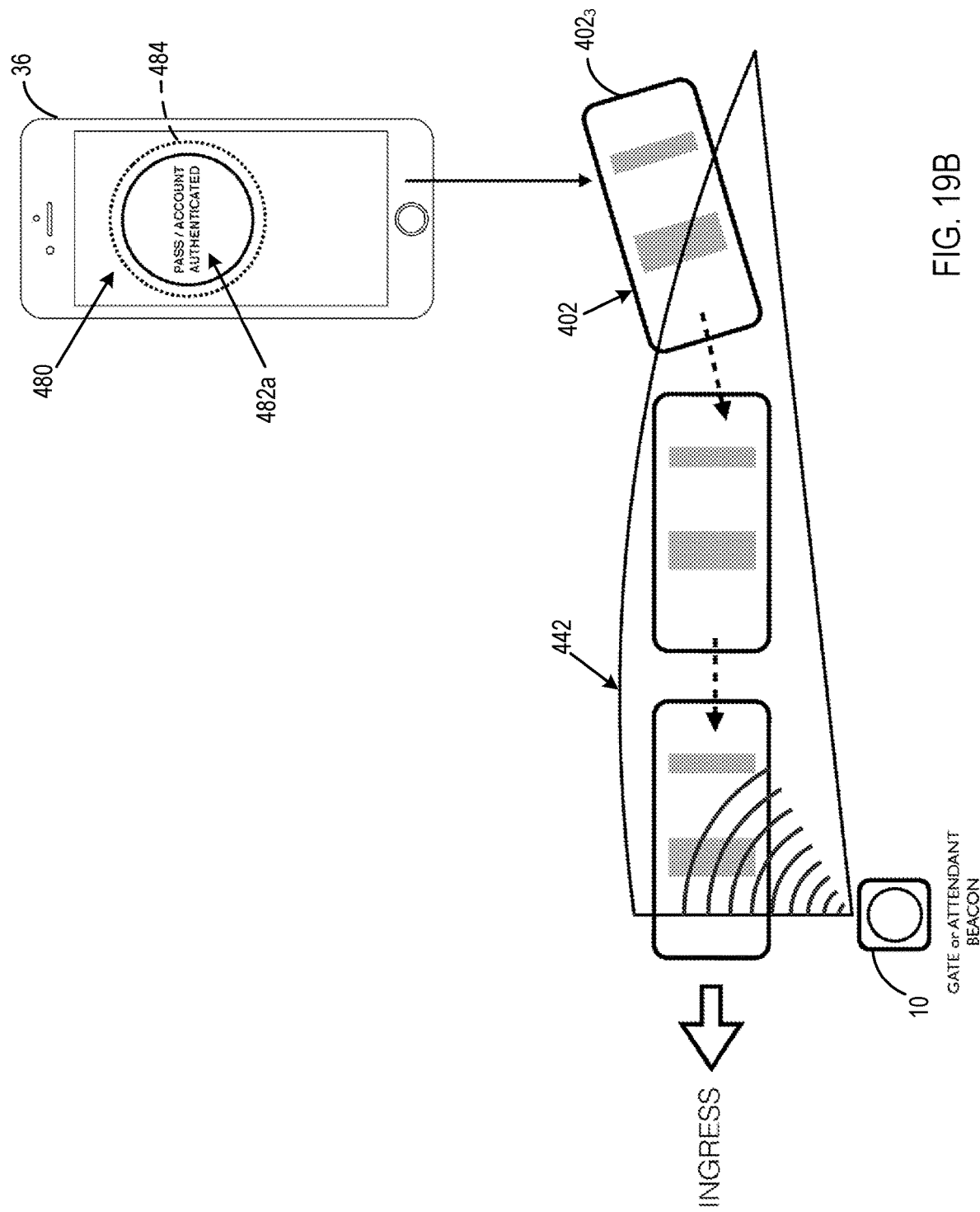

With reference to FIG. 19B, at this time, if the Citifyd App is off, the BTLE-GATT technology wakes up the Citifyd App and a connection handshake takes place over communication link 444 between user smartphone 36 and gate beacon 10. Through communication among user smartphone 36, gate beacon 10, and backend servers 70 (FIG. 16), the authentication process is complete. A change in a display screen background color 480 and a message 482a appearing on user smartphone 36 indicate successful completion of authentication. A moving component, such as a ring 484, on the display screen of user smartphone 36 provides assurance to the attendant that the display screen is live and not a photograph.

Figure 19C:
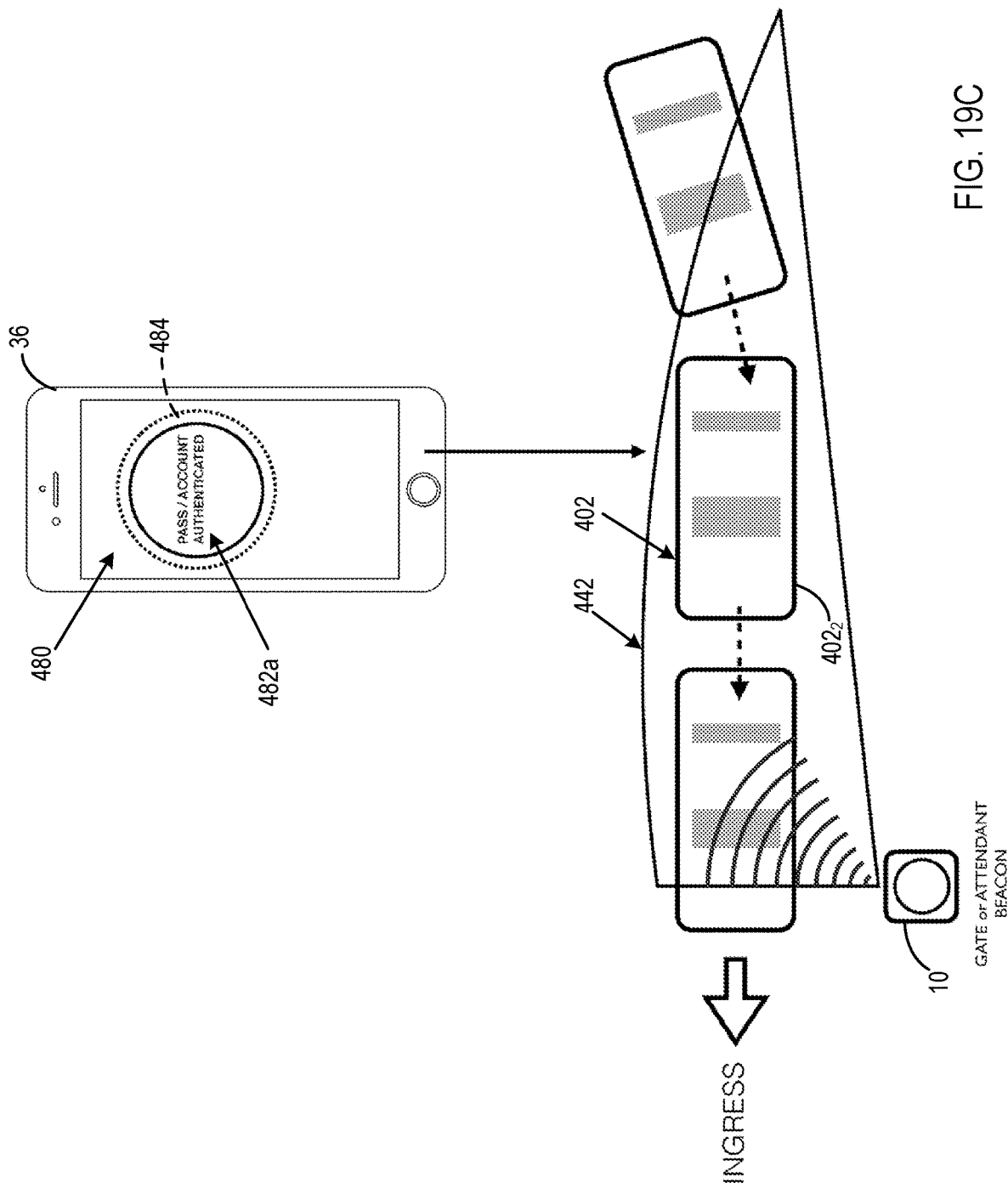

With reference to FIG. 19C, as vehicle 402 gets closer, at location $402_2$, to the gate or attendant, the changing movement (e.g., rotation or pulsation) of ring 484 and screen background color 480 indicate the approach to an authorization zone 486, where the gate is located or an attendant is standing.

Figure 19D:
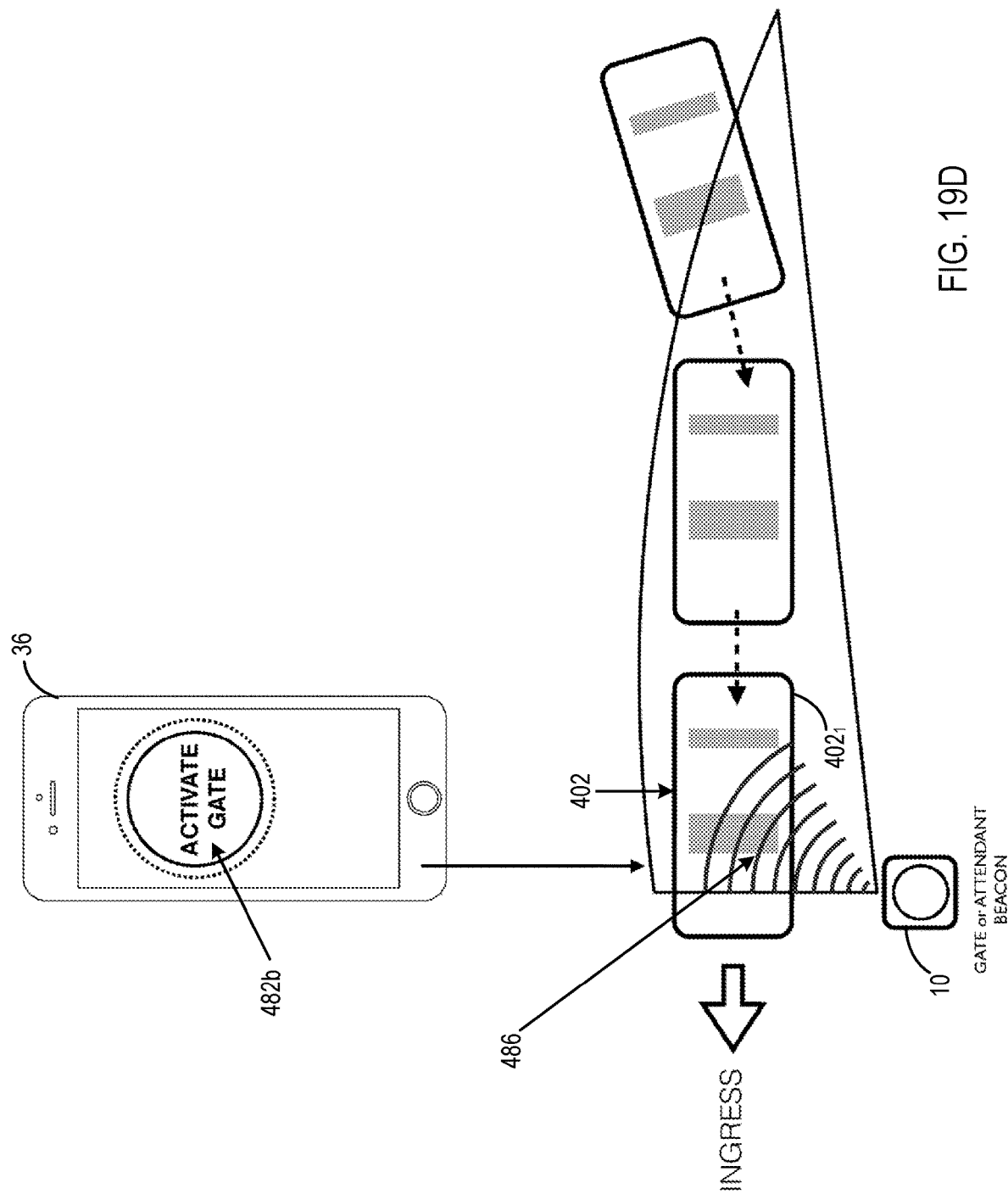

With reference to FIG. 19D, when vehicle 402 reaches authorization zone 486 at location $402_1$, the connection over communication link 444 between gate beacon 10 and user smartphone 36 changes the display screen such that an activation button/message 482b replaces authentication message 482a and prompts the vehicle driver to activate one or more of the gate, pass, and ticket.

Figure 19E:
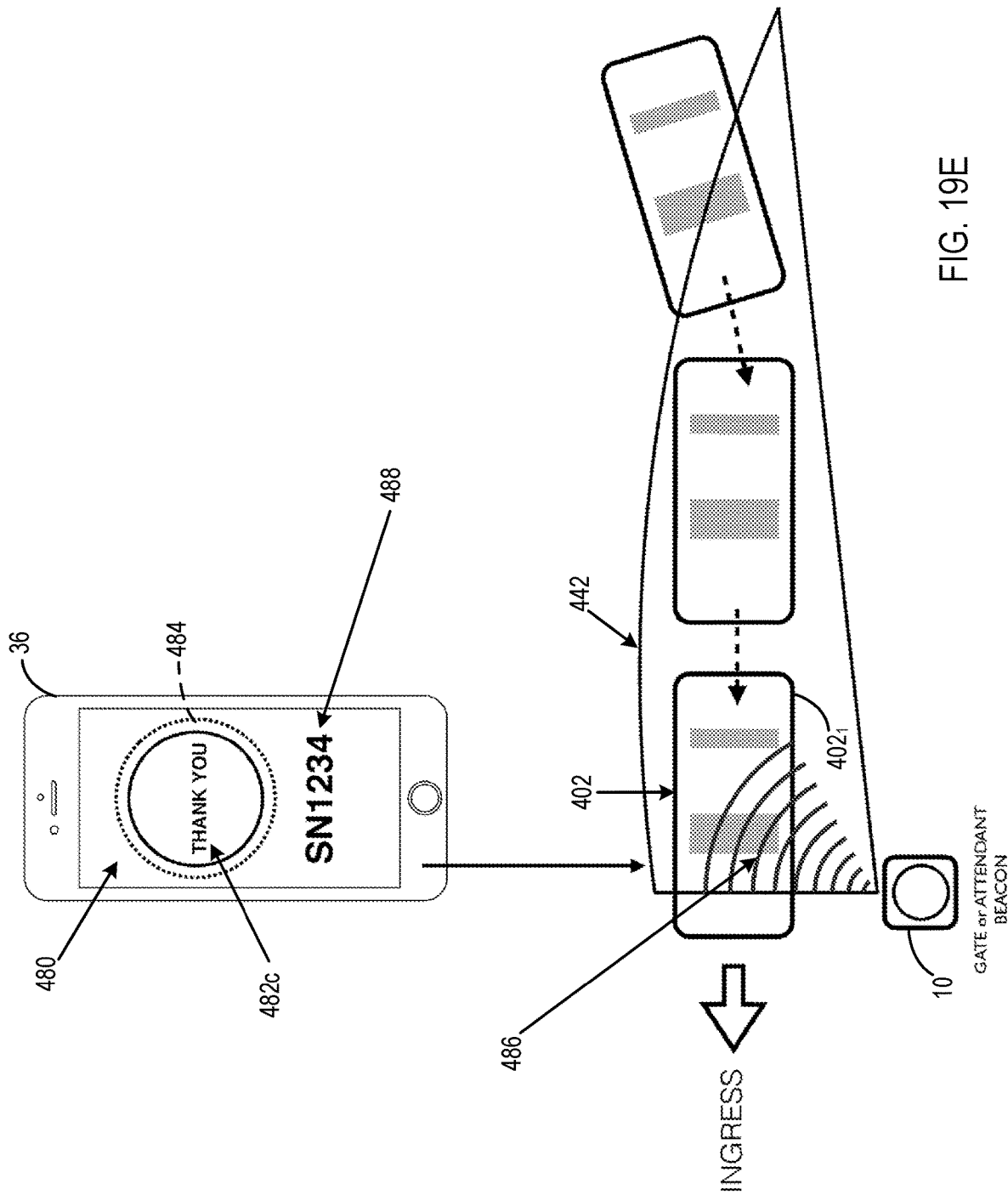

With reference to FIG. 19E, when the vehicle driver actuates button 482b on the display screen, authorization to admit the vehicle driver is made through communication among user smartphone 36, gate beacon 10, and backend servers 70 (FIG. 16). At this time, the gate opens, the attendant allows the vehicle driver to pass through the gate, or both. For occasions in which there is no gate and there are only attendants, to enhance security and reduce fraud, the actuation of button 482b also causes a change to the display screen background color 480 and display of a different message 482c. This action also creates a code/number 488 that appears on the display screen. The code identifies the gate beacon 10 to which user smartphone 36 is connected and the authorized entrance. Code/number 488 also identifies the event for which the pass was issued. Code/number 488 in conjunction with the moving image (in this embodiment a rotating or pulsating ring 488) and changing background color 480 assure the attendant of the authenticity of one or both of the pass and ticket.

The following describes in detail parking management activities associated with event-based vehicle parking in a facility into which system 60 is installed. The parking management activities are described with reference to FIG. 20, which is an annotated flow diagram showing the interaction between parking or backend servers 70 and a monitoring App operating on a parking attendant's or operator's hand-held device 450. The last digits of the figure number indicate the consecutive order of the drawing sheets as they are assembled from left to right to present the entire flow diagram. The flow diagram is in the form of screenshots showing information displayed on attendant's hand-held device 450 for different interactions with system 60 as different associated activities take place. A screenshot is represented by an alphanumeric character within a circle. A database symbol identified by an Arabic numeral within a circle represents an operational interaction in a series of operational actions with backend servers 70 as the activity is carried out.

Figures 1, 20:
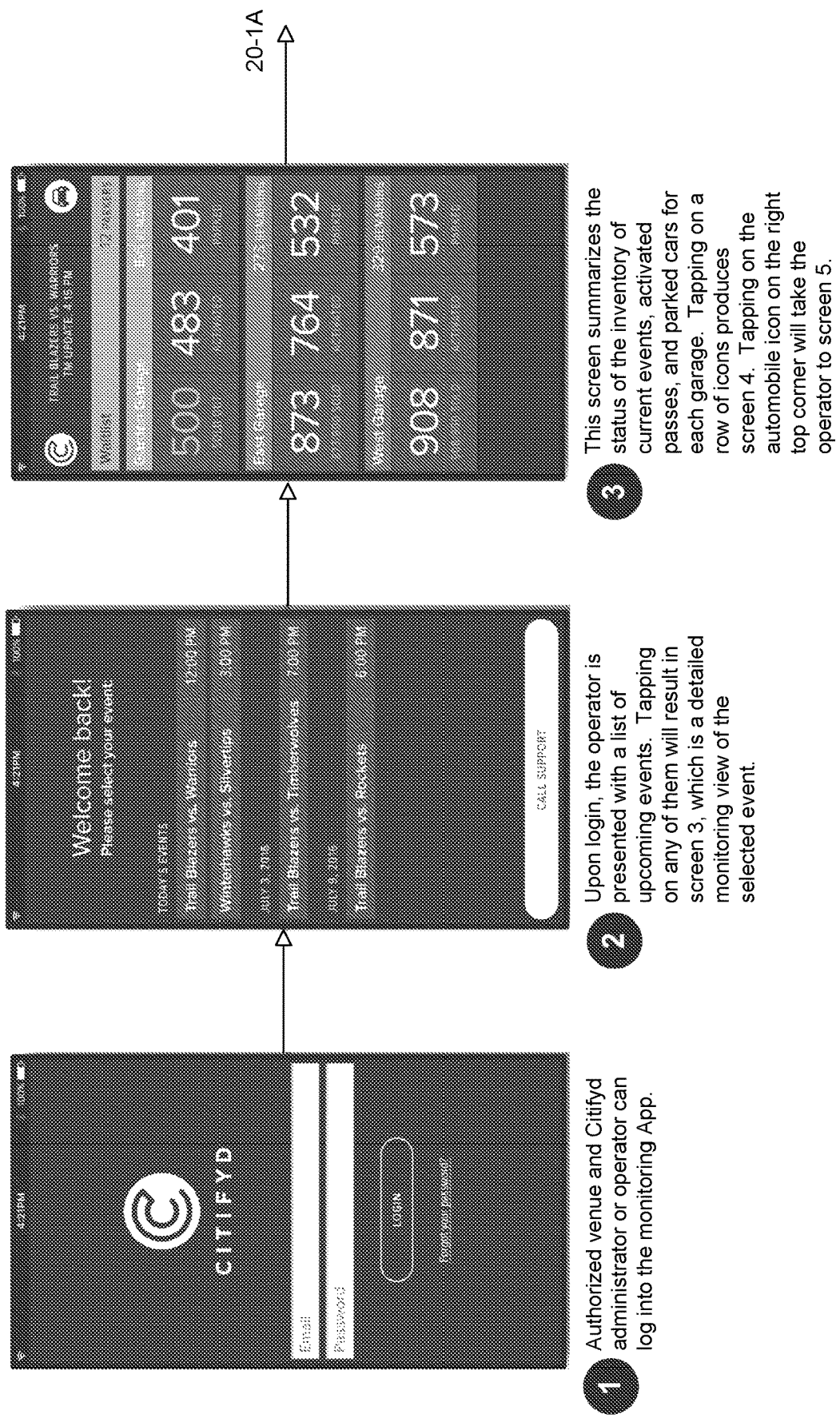
Figures 2, 20:
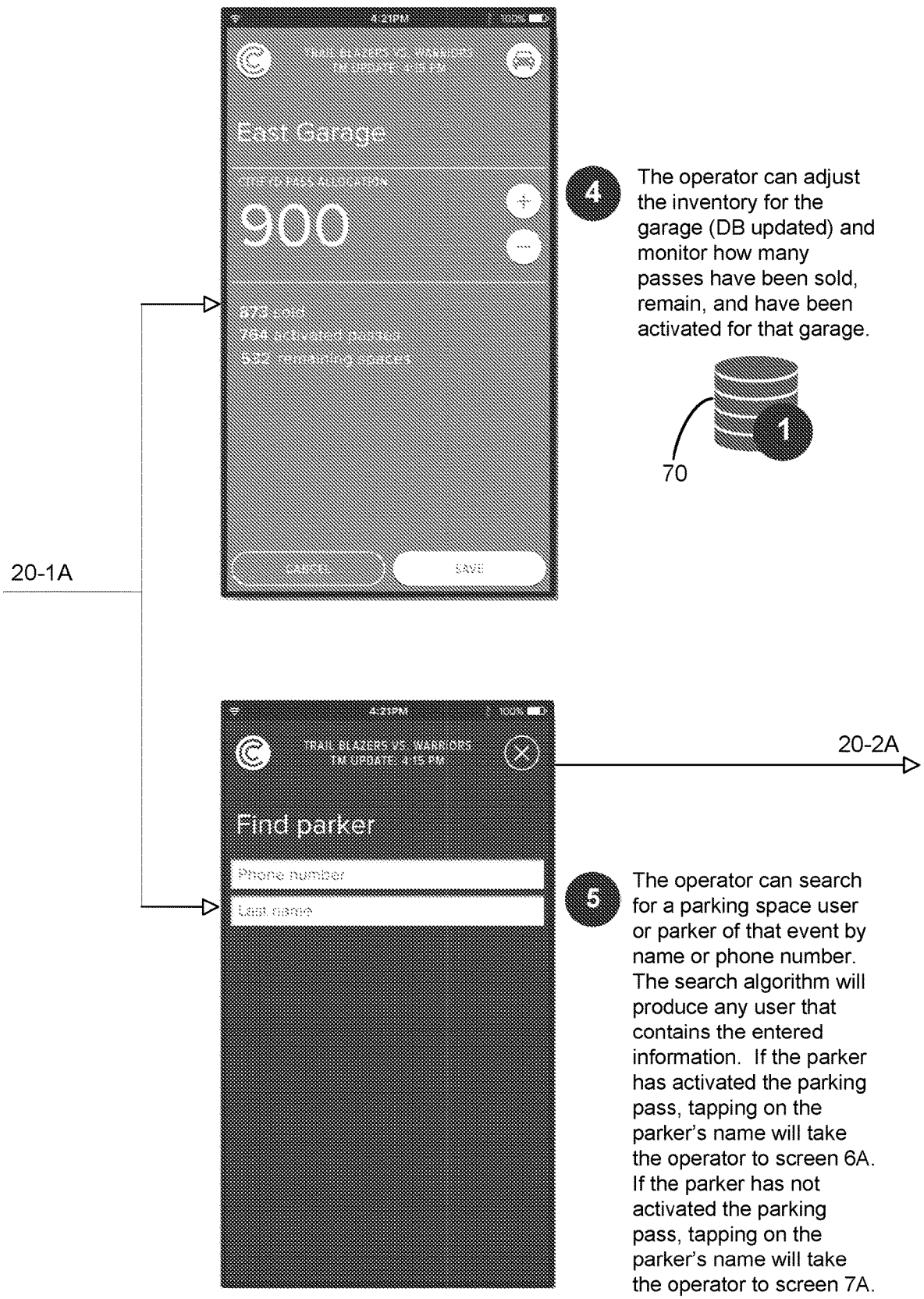
Figures 3, 20:
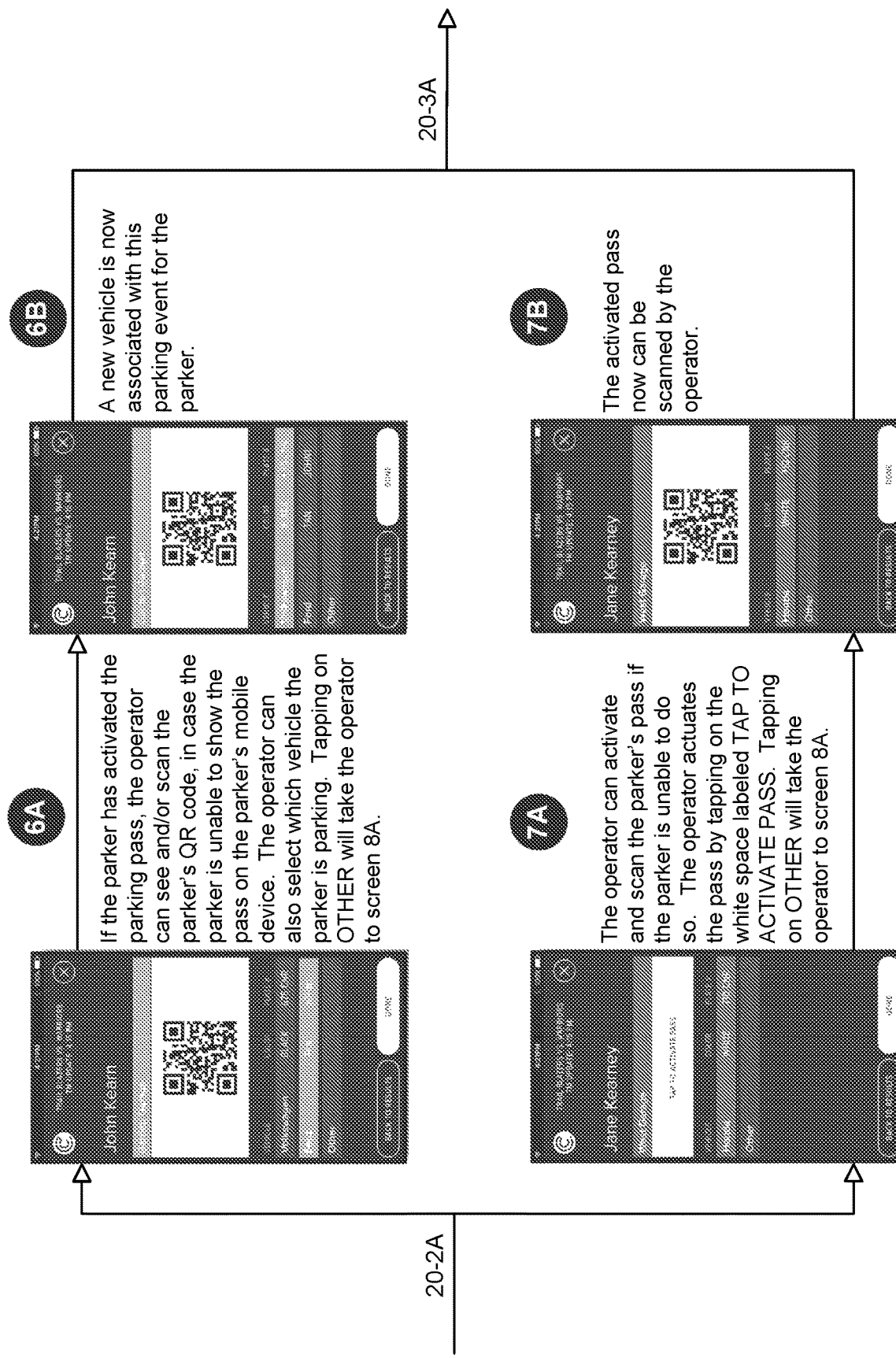
Figures 4, 20:
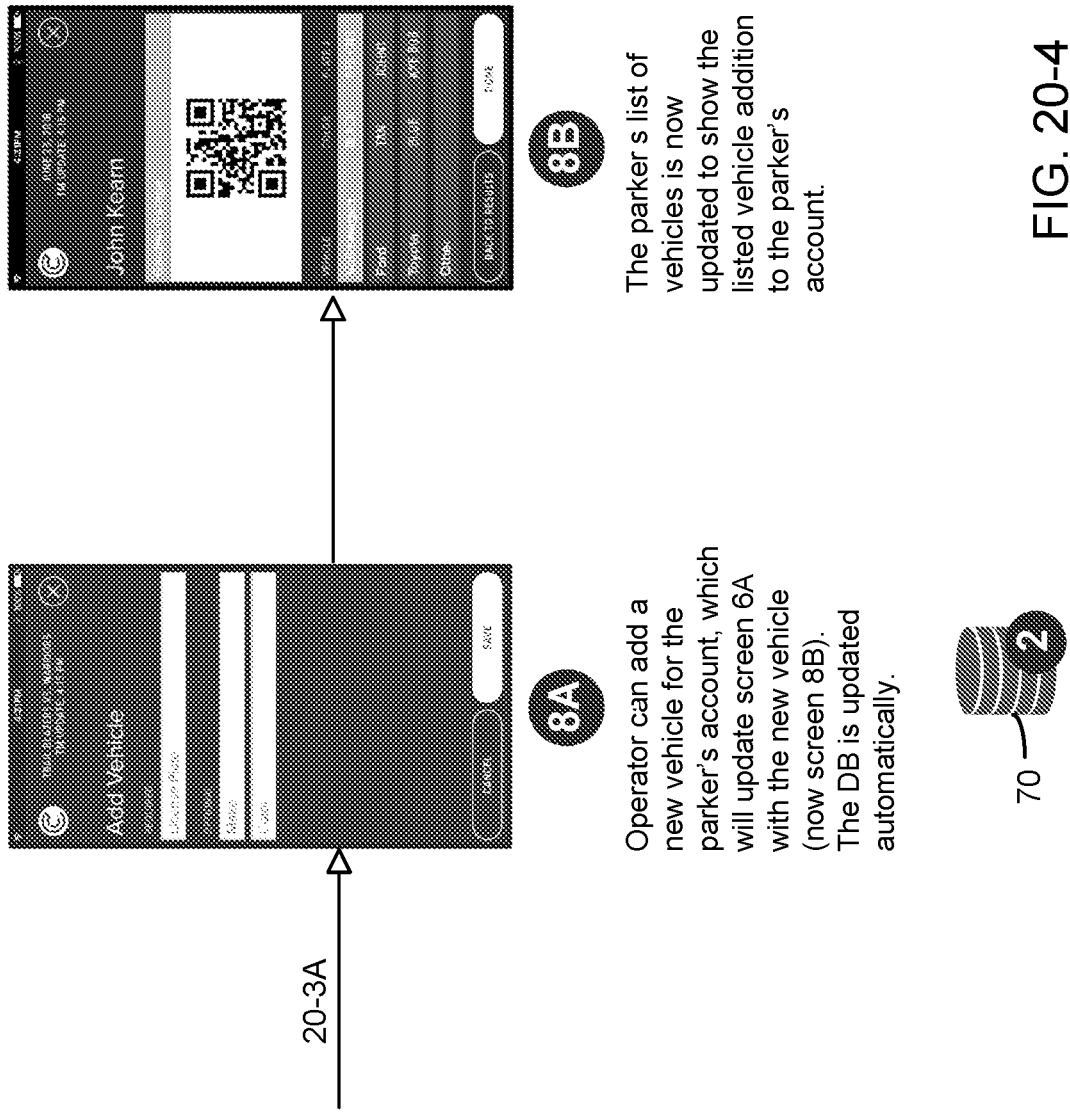

FIG. 20, which includes a set of four drawing sheets (FIGS. 20-1, 20-2, 20-3, and 20-4) describes the functions performed by the monitoring App operating on a parking attendant's hand-held device 450 in cooperation with backend servers 70 in carrying out parking facility management activities, including event-based inventory control, parking space pass purchase monitoring, and individual parking customer service tasks.

Screen 1 displays to the Citifyd administrator or operator a Login screen that includes Email and Password fields for completion to permit access to the monitoring App. The operator, by successfully entering the proper information and tapping on the LOGIN actuator, logs into the monitoring App and produces Screen 2. Screen 2 presents a list of upcoming events for which vehicle parking spaces are allocated. The operator, by tapping on any one of the displayed parking events, produces Screen 3, which, for the selected event, shows for each of three parking garage facilities, the numbers of parking passes sold, activated parking passes, and parked vehicles. An activated parking pass is a pass sold to a vehicle parker who has confirmed through the Citifyd App operating on user smart device 36 an intention to use the parking pass for the specified event. The inventory is expressed by showing the number of parking passes sold in relation to the total number of parking spaces allocated for each garage facility.

The operator has two options for actuating Screen 3. The operator, by tapping on a row of icons shown on Screen 3 for a given garage facility, produces Screen 4. Screen 4 enables the operator to adjust the inventory of parking spaces allocated for the selected garage facility and to monitor the number of passes sold, the number of passes activated, and the number of remaining allocated parking spaces in that garage facility. Operation 1 by backend servers 70 entails storing in its database any adjustment made to the inventory of allocated vehicle parking spaces. The operator, by tapping on an automobile icon, which is an image of the front end of an automobile in the upper right-hand corner of Screen 3, produces Screen 5, which relates to direct interaction between the operator and vehicle parker and enables operator use of a search algorithm to find the parking system account of a specific vehicle parker. Screen 5 displays telephone number and parker last name fields for completion by the operator to activate a search algorithm that performs a search of parking system accounts. A vehicle parker account developed by the search performed has either activated or not activated a purchased parking pass. The operator, by tapping on the vehicle parker's name shown on Screen 5, produces Screen 6A, if the parking pass has been activated, or produces Screen 7A, if the parking pass has not been activated.

Screen 6A shows the QR code of an activated parking pass of a vehicle parker identified by the search or the OR code of a vehicle parker's pass after it has been scanned by the operator when the QR code, for some reason, was not displayed on the vehicle parker's smart device 36. The operator, by tapping on an actuator identifying the specific vehicle to be parked, associates that specific vehicle with the selected parking event. When the vehicle being parked is not listed, the operator, by tapping the Other actuator, produces Screen 8A. Screen 8A displays a License Plate required field and vehicle Make and Color optional fields for completion by the operator to add a new vehicle to the vehicle parker's account. Upon completion of entry of the information about the vehicle, the operator, by tapping the Save actuator on Screen 8A, produces Screen 8B, which is an update of Screen 6A, and causes performance of Operation 2, which entails storing in the database of backend servers 70 the newly added vehicle information for this vehicle parker's account. Screen 6B represents the state in which a new vehicle, together with the QR code, is associated with the selected parking event for this vehicle parker.

Screen 7A shows a Tap to Activate Pass actuator, which the operator taps to activate a vehicle parker's previously non-activated pass for a listed vehicle. When the vehicle being parked is not listed, the operator, by tapping the Other actuator, produces Screen 8A and proceeds as described above in connection with a vehicle driver's activated pass for an unlisted vehicle. Upon completion of adding a new vehicle to the vehicle parker's account, the operator taps the Tap to Actuate Pass actuator to activate the vehicle parker's pass for the newly added vehicle. Screen 7B shows the QR code of the newly activated pass, which the operator can scan.

It will be obvious to those having skill in the art that many changes may be made to the details of the above-described embodiments without departing from the underlying principles of the invention.

As a first example, iBeacon protocol functionality can be employed in the source beacon and used for broadcast in alternate time periods with GATT to facilitate communication with the customer smart device and be compatible with both standards.

As a second example, beacon 10 may be implemented with a communication signal interface to establish, through Wi-Fi local area wireless computer networking technology or cellular communication network protocol, a wireless communication link with the communication network system operating in a vehicle parking or mass transit station facility. This capability would enable a customer to carry out a parking or mass transit transaction under a circumstance of operational delay or failure of wireless communication link 76 between user smartphone 36 and backend servers 70. Under such circumstance, a customer entering a parking garage or a transit station terminus can use smartphone 36 to carry out a transaction by establishing, through the garage or station facility Wi-Fi or cellular communication network system, a communication link between beacon 10 and backend servers 70.

As a third example, another way for a parking attendant to search for a parking pass that cannot be activated entails the parking attendant using hand-held device 450 as a beacon. By bringing hand-held device 450 close to the user smartphone 36 for a BLE connection handshake, hand-held device 450 receives the account identification number from user smartphone 36 and contacts backend servers 70 or uses its downloaded database located within hand-held device 450 to check for authorization and validation of the pass. The scope of the present invention should, therefore, be determined only by the following claims.

The invention claimed is:

1. A vehicle parking and mass transport beacon system, comprising:

an entrance for ingress and an exit for egress of a user, each of the entrance and the exit associated with a source beacon configured to broadcast its identity by emitting a short-range wireless radio signal and to emit the short-range wireless radio signal from a location of apparatus associated with a vehicular transportation system;

a smart device implemented with radio frequency wireless technology to provide location-based information content, the smart device, when in proximity to each source beacon associated with the entrance and the exit, receiving the short-range wireless radio signal and identifying the source beacon to establish connectivity on a wireless communication link for information transfer between the source beacon and the smart device; and a mobile application operating on the smart device to initiate and conclude a vehicle parking or mass transit travel session, the mobile application initiating the session in response to emissions from the source beacon associated with the entrance through use of the wireless communication link to effect a connection handshake with the smart device to produce a signal indicating authentication of the user for entry into an area to park a first vehicle when it is carrying the user accompanied by the smart device or to ride on a second vehicle when the user is carrying the smart device, the signal indicating authentication of the user for entry being derived from digital entry identification code data embedded in the smart device, and the source beacon associated with the entrance being configured to generate a first timestamp representing a time of entry of the user into the area, and the mobile application concluding the session in response to emissions from the source beacon associated with the exit through use of the wireless communication link to effect a connection handshake with the smart device to produce a signal indicating authentication of the user for departure from the area to end parking of the first vehicle carrying the user accompanied by the smart device or to end riding of the user carrying the smart device on the second vehicle, the source beacon associated with the exit being configured to detect departure of the smart device from the area to enable generation of a second timestamp for use, together with the first timestamp, by the system to calculate a fee for the vehicle parking session or the mass transit travel session.

2. The beacon system of claim 1, in which the smart device is a smartphone.

3. The beacon system of claim 1, further comprising a backend server in communication with the smart device through a wireless communication link and in communication with a vehicle parking or transportation service provider through a wireless globally accessible information network, the backend server storing for access by the vehicle parking or transportation service provider travel activity and payment information relating to an account established by the user.

4. The beacon system of claim 1, in which the smart device includes motion sensor technology to detect movement of the user carrying the smart device and to distinguish between walking and running movements of the user and movement of the first vehicle and thereby detect when the user carrying the smart device attempts to prematurely conclude a vehicle parking transaction session.

5. The beacon system of claim 1, further comprising alternative wireless communication capability in beacon system components for effecting a travel transaction session in the event of an interruption in connectivity between the source beacon and smart device when they are in proximity to each other.

6. The beacon system of claim 1, in which the signal indicating authentication of the user for departure is derived from digital exit identification code data embedded in the smart device by operation of the source beacon associated with the entrance.

7. The beacon system of claim 1, in which the signal indicating authentication of the user for entry is produced in response to user actuation of a barrier activation control generated on the smart device.

8. The beacon system of claim 1, in which the signal indicating authentication of the user for departure is produced in response to user actuation of a barrier activation control generated on the smart device.

9. The beacon system of claim 1, in which the apparatus includes a parking garage or surface lot barrier that is located for operative connection to the source beacon associated with the entrance for ingress to, or to the exit for egress from, the area.

10. The beacon system of claim 1, in which the apparatus includes a mass transit system barrier that is located at a mass transit system terminus.

11. The beacon system of claim 1, in which the vehicular transportation system is a mass transit system of which the user is a passenger, and in which the apparatus includes a vehicle having a passenger ingress or egress opening to which a source beacon associated with the entrance or the exit is proximally located.

12. The beacon system of claim 1, in which the signal indicating authentication of the user for entry into the area includes an auditory ora visual indication that is perceptible by an attendant responsible for giving the user permission to enter the area.

13. The beacon system of claim 1, in which the second timestamp is generated by a navigation system locating and tracking the smart device once a predetermined distance is reached between the smart device and the beacon associated with the exit.

14. The beacon system of claim 1, in which, after departure of the smart device from the area and generation of the second timestamp, the beacon system transmits digital entry identification code data to the smart device, the smart device embedding the digital entry identification code data for use in a next entry into an area for a next vehicle parking or mass transit travel session.

15. The beacon system of claim 1, further comprising a backend server in communication with the smart device through a wireless communication link, and in which the backend server embeds the digital entry identification code data in the smart device before connectivity is established between the source beacon associated with the entrance for vehicle ingress to the area and the smart device.

16. The beacon system of claim 1, in which the smart device is configured to enable a backend server to create an authorization ticket that is hidden from the user's access and view.

17. The beacon system of claim 1, in which the entrance and the exit share the same source beacon.

18. The beacon system of claim 1, in which the smart device includes motion sensor technology to detect movement of the user carrying the smart device and to cooperate with a navigation system locating and tracking the smart device to distinguish between walking and running movements of the user and movement of the second vehicle.

19. A vehicle parking and mass transport beacon system, comprising:

an entrance for ingress and an exit for egress of a user, each of the entrance and the exit associated with a source beacon configured to broadcast its identity by emitting a short-range wireless radio signal and to emit the short-range wireless radio signal from a location of apparatus associated with a vehicular transportation system;

a smart device implemented with radio frequency wireless technology to provide location-based information content, the smart device, when in proximity to each source beacon associated with the entrance and the exit, receiving the short-range wireless radio signal and identifying the source beacon to establish connectivity on a wireless communication link between the source beacon and the smart device;

a magnetometer that is capable of detecting a large mass of metal; and a mobile application operating on the smart device to initiate and conclude a vehicle parking or mass transit travel session, the mobile application initiating the session in response to emissions from the source beacon associated with the entrance through use of the wireless communication link with the smart device to produce a signal indicating authentication of the user for entry into an area to park a first vehicle when it is carrying the user accompanied by the smart device or to ride on a second vehicle when the user is carrying the smart device, the first vehicle characterized by a large mass of metal, and the magnetometer cooperating with the smart device and the source beacon associated with the entrance while in a state of wireless connectivity with each other to detect the first vehicle to prevent accidental activation of a vehicle parking transaction session, the signal indicating authentication of the user for entry being derived from digital entry identification code data embedded in the smart device, and the source beacon associated with the entrance being configured to generate a first timestamp representing a time of entry of the user into the area, and the mobile application concluding the session in response to emissions from the source beacon associated with the exit through use of the wireless communication link with the smart device to produce a signal indicating authentication of the user for departure from the area to end parking of the first vehicle carrying the user accompanied by the smart device or to end riding of the user carrying the smart device on the second vehicle, the source beacon associated with the exit being configured to detect departure of the smart device from the area to enable generation of a second timestamp for use, together with the first timestamp, by the system to calculate a fee for the vehicle parking session or the mass transit travel session.

\* \* \* \* \*